United States Patent
Gan et al.

(10) Patent No.: US 9,778,535 B2
(45) Date of Patent: Oct. 3, 2017

(54) PARTICLE DISPERSION FOR DISPLAY, DISPLAY MEDIUM, AND DISPLAY DEVICE

(71) Applicant: E INK CORPORATION, Billerica, MA (US)

(72) Inventors: Taijyu Gan, Kanagawa (JP);
Tomozumi Uesaka, Kanagawa (JP);
Hiroaki Moriyama, Kanagawa (JP);
Nami Tokunaga, Kanagawa (JP);
Yoshinori Machida, Kanagawa (JP)

(73) Assignee: E Ink Corporation, Billerica, MA (US)

( * ) Notice: Subject to any disclaimer, the term of this patent is extended or adjusted under 35 U.S.C. 154(b) by 78 days.

(21) Appl. No.: 14/600,625

(22) Filed: Jan. 20, 2015

(65) Prior Publication Data

US 2016/0033844 A1  Feb. 4, 2016

(30) Foreign Application Priority Data

Jul. 29, 2014  (JP) ................................. 2014-154237

(51) Int. Cl.
*G02B 26/00* (2006.01)
*G02F 1/167* (2006.01)

(52) U.S. Cl.
CPC ...... *G02F 1/167* (2013.01); *G02F 2001/1678* (2013.01)

(58) Field of Classification Search
CPC ............... G02F 1/133348; G02F 1/167; G02F 2001/1678
USPC .................................................. 359/290–296
See application file for complete search history.

(56) References Cited

U.S. PATENT DOCUMENTS

| | | | |
|---|---|---|---|
| 2007/0126694 A1* | 6/2007 | Moriyama | G02F 1/167 345/107 |
| 2007/0188509 A1 | 8/2007 | Shigehiro et al. | |
| 2008/0036731 A1 | 2/2008 | Shigehiro et al. | |
| 2014/0016180 A1* | 1/2014 | Yamazaki | G02F 1/0009 359/296 |

FOREIGN PATENT DOCUMENTS

JP  2007249188 A  9/2007

* cited by examiner

*Primary Examiner* — Scott J Sugarman
*Assistant Examiner* — Vipin Patel
(74) *Attorney, Agent, or Firm* — Antranig Baronian

(57) ABSTRACT

A particle dispersion and the display devices in which the dispersion may be incorporated are provided. The particle dispersion includes a dispersion medium, one or more types of particle groups that are dispersed in the dispersion medium that may differ based on color and/or charge, and counter-ions oppositely charged than the one or more particle groups. The particle groups and counter-ions are moved in the dispersion medium according to an electric field formed in the dispersion medium. The one or more types of particle groups are configured such that the total amount of charges of one type of particle group (a) among the one or more types of particle groups is greater than a total amount of charges of the counter-ions that are charged with a polarity opposite to that of the particle group (a).

5 Claims, 6 Drawing Sheets

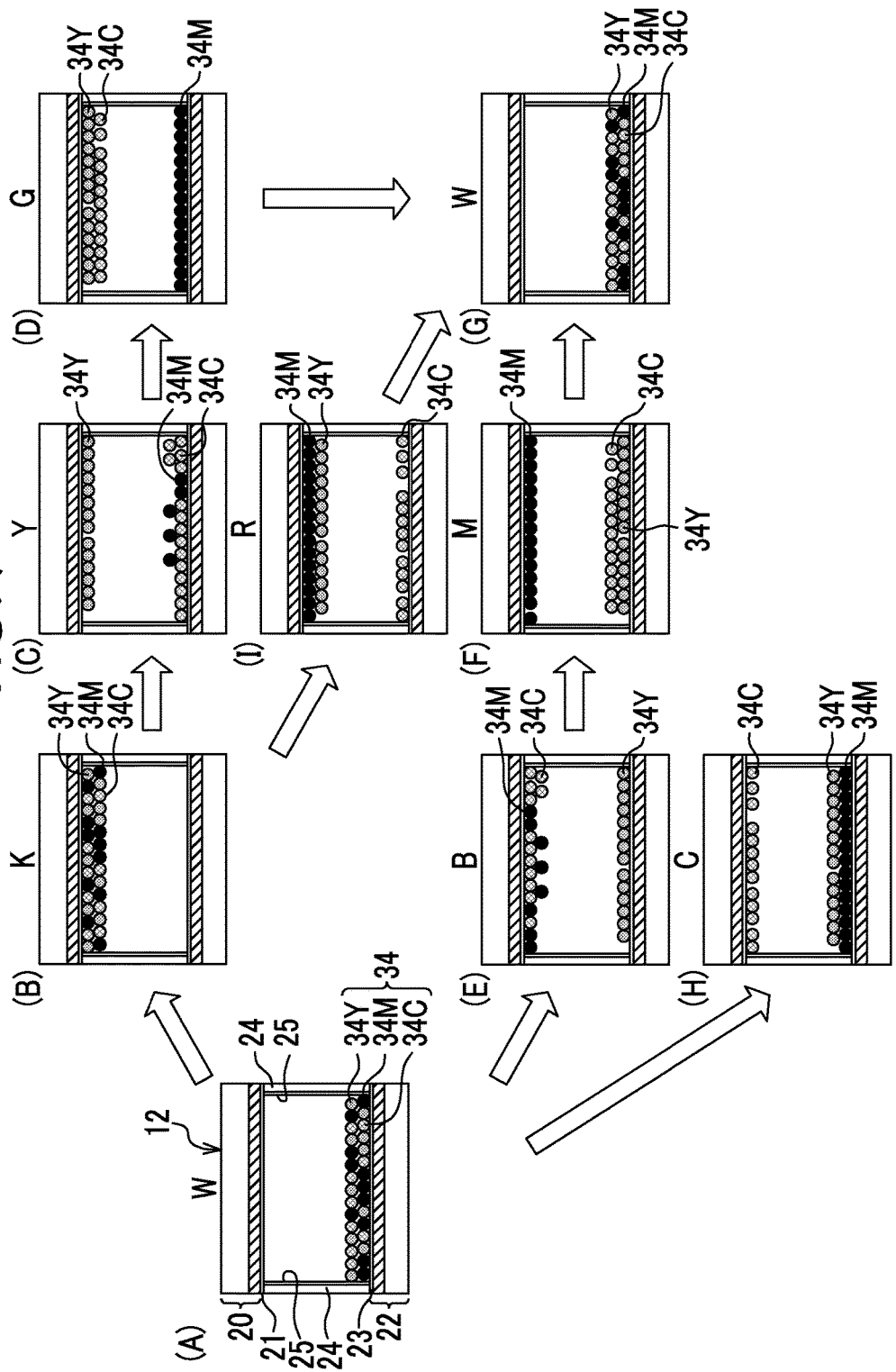

PARTICLE DISPERSION FOR DISPLAY, DISPLAY MEDIUM, AND DISPLAY DEVICE

CROSS-REFERENCE TO RELATED APPLICATIONS

This application is based on and claims priority under 35 USC 119 from Japanese Patent Application No. 2014-154237 filed Jul. 29, 2014.

BACKGROUND

1. Technical Field

The present invention relates to a particle dispersion for display, a display medium, and a display device.

2. Related Art

In the related art, as a display medium capable of repeatedly rewriting, a display medium using particles is known. The display medium, for example, includes a pair of substrates, and a particle group enclosed between the substrates to be moved between the substrates according to an electric field formed between the pair of substrates. In addition, in order to prevent the particles from being biased to a specific region in the substrate, a partition wall (a gap member) for partitioning a space between the substrates into plural cells is disposed between the substrates.

SUMMARY

According to an aspect of the invention, there is provided a particle dispersion for display, including:

a dispersion medium; and one or more types of particle groups that are dispersed in the dispersion medium, and are moved in the dispersion medium according to an electric field formed in the dispersion medium, wherein a total amount of charges of one type of particle group (a) among the one or more types of particle groups is greater than a total amount of charges of ions that are charged with a polarity opposite to that of the particle group (a) and are movable in the dispersion medium.

BRIEF DESCRIPTION OF THE DRAWINGS

Exemplary embodiments of the present invention will be described in detail based on the following figures, wherein:

FIG. 7 is an explanatory diagram schematically illustrating a relationship between a mode of voltage to be applied between the substrates of the display medium and a mode of movement of the particles.

DETAILED DESCRIPTION

Hereinafter, exemplary embodiments of a display medium and a display device according to the invention will be described.

Particle Dispersion for Display

A particle dispersion for display (hereinafter referred to as "display dispersion") according to this exemplary embodiment includes a dispersion medium, and one or more types of particle groups which are dispersed in the dispersion medium, and are moved in the dispersion medium according to an electric field formed in the dispersion medium.

Here, in the display dispersion according to this exemplary embodiment, as the one or more types of particle groups, only one type of particle group may be included, or two or more types of particle groups may be included. Furthermore, a "type" of particle group indicates that at least one of a color and a threshold voltage at which the movement in the dispersion medium is started is different, and in general, both the color and the threshold voltage are different.

One or more types of particle groups which are moved in the dispersion medium according to the electric field and are included in the display dispersion according to this exemplary embodiment are charged with either a positive polarity or a negative polarity. In addition, there are ions which are charged with a polarity opposite to that of the particle group and are movable in the dispersion medium, which are so-called counter ions, in the display dispersion including at least a particle group which is charged with a positive polarity or a negative polarity.

In this exemplary embodiment, a total amount of charges of one type of particle group (a) among the one or more types of particle groups is greater than a total amount of charges of ions (the counter ions) which are charged with a polarity opposite to that of the particle group (a) and are movable in the dispersion medium.

Figure 1A:
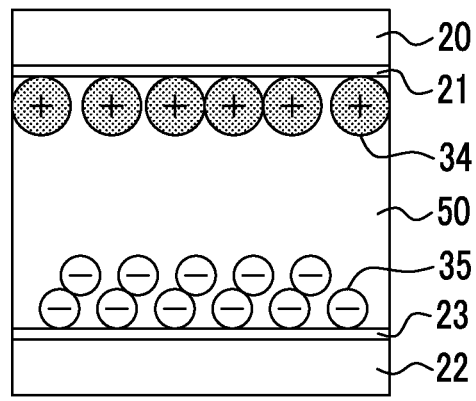
FIG. 1A is a conceptual diagram for describing a mechanism in which dissipation of an adhesion force between a particle group and a substrate occurs.

As illustrated in FIG. 1A, the display dispersion is generally used by being enclosed in a region interposed between a pair of substrates 20 and 22. Furthermore, in FIG. 1A, the substrates 20 and 22 include surface layers 21 and 23 on a surface in contact with a dispersion medium 50, respectively. A voltage is applied to the pair of substrates 20 and 22, an electric field is formed between the substrates, and a particle group 34 (in FIG. 1A, a positively charged particle group) dispersed in the dispersion medium 50 is moved to any one surface of the pair of substrates 20 and 22, and thus an image is displayed. Furthermore, the particle group 34 which is moved to and attached to the surface of the substrate is required to have a property that the particle group 34 is continuously maintained on the surface of the substrate after releasing the voltage, that is, a memory property.

There are ions (the counter ions, in FIG. 1A, negatively charged ions) 35 which have a total amount of charges equivalent to that of the particle group 34 and are charged with an opposite polarity in the dispersion medium 50, and when the counter ions 35 are diffused at a relaxation process, an adhesion force between the particle group 34 and the substrate 20 is dissipated, and thus an image is not kept in some cases.

Figure 1B:
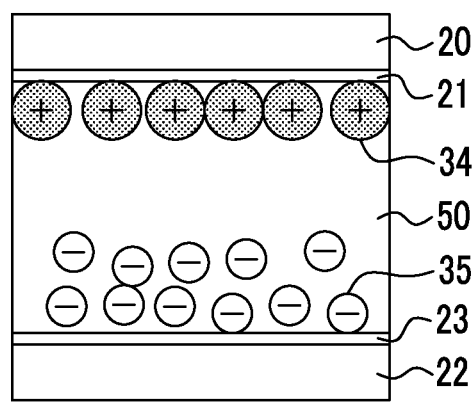
FIG. 1B is a conceptual diagram for describing a mechanism in which dissipation of the adhesion force between the particle group and the substrate occurs.
Figure 1C:
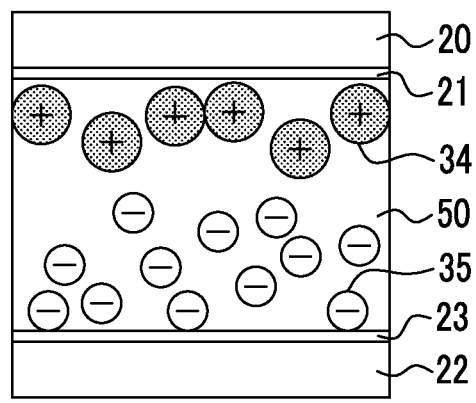
FIG. 1C is a conceptual diagram for describing a mechanism in which dissipation of the adhesion force between the particle group and the substrate occurs.

Specifically, when a voltage is applied between the substrates 20 and 22, the particle group 34 and the counter ions 35 are moved to and attached to the substrates 20 and 22 facing each other, respectively. When the voltage is cut off, the particle group 34 falls into a potential well formed by a charge of the particle group itself, and as illustrated in FIG. 1A, an adhesion force is exerted to the substrate 20. On the other hand, the counter ions 35 are in the shape of a micro ion, and thus are easily detached from the potential well formed by the charge of the counter ions 35 by Brownian motion or the like (refer to FIG. 1B). The counter ions 35 detached from the potential well are moved toward the particle group 34 according to a gradient of an internal potential formed between the counter ions 35 and the particle group 34. An internal potential distribution between the substrates 20 and 22 is changed according to the relaxation movement of the counter ions 35, a potential peak in the vicinity of the particle group 34 decreases, and when the decrease in the potential peak exceeds a certain point, the potential well in the vicinity of the particle group 34 is dissipated, and thus as illustrated in FIG. 1C, the adhesion force between the particle group 34 and the substrate 20 is dissipated in some cases.

In contrast, in this exemplary embodiment, a total amount of charges of one type of particle group (a) among the particle groups included in the display dispersion is greater than a total amount of charges of ions (the counter ions) which are charged with a polarity opposite to that of the particle group (a) and are movable in the dispersion medium.

When the dispersion medium including the counter ions having a total amount of charges equivalent to that of the particle group is used, an internal electric field in a particle gravity center position, when the counter ions are slowly diffused and moved, is calculated from an initial position (that is, a state where the particle group is included in one substrate of the substrates facing each other, and the counter ions are included in the other substrate), and thus it is understood that an adhesion force between the particle group and the substrate is dissipated when the counter ions are diffused by 100%. Accordingly, it is considered that when the total amount of charges of ions (the counter ions) which are freely movable in the dispersion medium is less than the total amount of charges of the particle group, an excellent memory property is obtained.

Case of Including One Type of Particle Group

When the display dispersion according to this exemplary embodiment contains only one type of particle group (1a) as the particle group which is moved in the dispersion medium according to the electric field, a total amount of charges of the particle group (1a) is greater than a total amount of charges of ions (the counter ions) which are charged with a polarity opposite to that of the particle group (1a) and are movable in the dispersion medium. Accordingly, an excellent memory property of the particle group (1a) is obtained.

Furthermore, when the total amount of charges of the particle group (1a) is 1, the total amount of charges of the ions (the counter ions) which are charged with a polarity opposite to that of the particle group (1a) and are movable in the dispersion medium is preferably less than or equal to 0.8, and more preferably less than or equal to 0.6.

The polarity of the particle group (1a) may be a positive charge, or may be a negative charge.

Case of Including Two or More Types of Particle Groups Having Homopolarity

When the display dispersion according to this exemplary embodiment contains a particle group (2a) and a particle group (2b) which are charged with a homopolarity as the particle group which is moved in the dispersion medium according to the electric field, a total amount of charges of at least one type of particle group (2a) is greater than a total amount of charges of ions (the counter ions) which are charged with a polarity opposite to that of the particle groups and are movable in the dispersion medium. Accordingly, an excellent memory property of at least the particle group (2a) is obtained.

Furthermore, when the total amount of charges of the particle group (2a) is 1, a preferable range of the total amount of charges of the ions (the counter ions) which are charged with a polarity opposite to that of the particle group (2a) and are movable in the dispersion medium is the same as that in the particle group (1a).

The polarity of the particle groups (2a) and (2b) may be a positive charge, or may be a negative charge.

Furthermore, it is preferable that the particle group (2a) be a particle group having the smallest surface charge density among the particle group (2a) and the particle group (2b). The surface charge density is an index of a charge amount being charged, that is, a threshold index. In a system where there are various types of particle groups having different surface charge densities, that is, different threshold values, it is difficult to obtain a memory property of a particle group having the smallest surface charge density. Therefore, by setting the total amount of charges of the counter ions to be less than the total amount of charges of the particle group having the smallest surface charge density, and thus an excellent memory property is obtained with respect to the entire particle group included in the dispersion.

Furthermore, the surface charge density of the particle group is measured by the following method.

An external voltage is applied between electrodes, and the particle group is moved from one substrate to the other substrate. At this time, a current flowing between the electrodes is measured by an ammeter, and the total amount of charges of the particle group is calculated from an integrated value of the detected current. By dividing the total amount of charges of the particle group by the number of particles in the system, a charge amount per each particle is obtained, and by dividing the total amount of charges of the particle group by the surface area of the particles, the surface charge density of the particles is calculated.

In addition, when there are various types of particle groups in the system, a charge amount of each of the particles is obtained by the following method. The threshold values of the respective particle groups are different from each other, and thus only a certain particle group is moved by adjusting the size or the length of a voltage pulse applied between the electrodes. For example, a voltage which moves only the particle group (2a) having the smallest threshold value is applied, thus the particle group (2a) is moved, and at this time, the surface charge density of the particle group (2a) is obtained from the detected current. Subsequently, a voltage which moves the particle group (2b) having the second smallest threshold value is applied, thus the particle group (2b) is moved, and at this time, the surface charge density of the particle group (2b) is obtained from the detected current. By repeating this procedure, each surface charge density of the entire particle group in the system is measured.

In addition, it is preferable that the particle group (2a) be a particle group having the largest volume average particle size among the particle group (2a) and the particle group (2b). In the system where there are various types of particle groups having different particle sizes, it is difficult to obtain a memory property of the particle group having the largest volume average particle size. Therefore, by setting the total amount of charges of the counter ions to be less than the total amount of charges of the particle group having the largest volume average particle size, and thus an excellent memory property is obtained with respect to the particle group having a large particle size.

Furthermore, the volume average particle size of the particle group is measured by the following method.

The volume average particle size (a primary particle size) of the particle group is measured by using Coulter Multisizer-II (manufactured by Beckman-Coulter Inc.) with an aperture diameter of 50 μm. At this time, the measurement is performed after the particle group is dispersed in an electrolyte aqueous solution (ISOTON aqueous solution, manufactured by Beckman-Coulter Inc.), and then is dispersed for 30 seconds or more using an ultrasonic wave.

As a measuring method, 0.5 mg to 50 mg of a measurement sample is added to a surfactant as a dispersant, preferably, 2 ml of an aqueous solution including 5% by weight of sodium alkylbenzene sulfonate, and thus obtained solution is added to 100 ml to 150 ml of an electrolyte solution. The electrolyte solution in which the measurement sample is suspended is subjected to a dispersion treatment for 1 minute by using an ultrasonic disperser, and thus a particle size distribution of the particle group is measured. The number of particles to be measured is 50,000.

A cumulative distribution of volume is drawn from a small diameter side with respect to a particle size range (a channel) divided on the basis of the measured particle size distribution, and a particle size having a cumulation of 50% is defined as the volume average particle size (the primary particle size).

Furthermore, even when three or more types of particle groups having a homopolarity are included, a total amount of charges of at least one type of particle group (a) is greater than the total amount of charges of the ions (the counter ions) which are charged with a polarity opposite to that of the particle group and are movable in the dispersion medium, and thus an excellent memory property is obtained with respect to at least the particle group (a). In addition, it is preferable that the particle group (a) be a particle group having the smallest surface charge density among the three or more types of particle groups. Further, it is preferable that the particle group (a) be a particle group having the largest volume average particle size among the three or more types of particle groups.

Case of Including, for Each Polarity, One or More Types of Particle Groups Having Heteropolarity When the display dispersion according to this exemplary embodiment contains a positively charged particle group ($a^+$) and a negatively charged particle group ($a^-$) as the particle group which is moved in the dispersion medium according to the electric field, a total amount of charges of at least one type of particle group (for example, the positively charged particle group ($a^+$)) is greater than the total amount of charges of the ions (the counter ions) which are charged with a polarity (for example, a negative polarity) opposite to that of the particle group and are movable in the dispersion medium. Accordingly, an excellent memory property is obtained with respect to at least the particle group (for example, the positively charged particle group ($a^+$)).

Furthermore, when the total amount of charges of the particle group ($a^+$) or the particle group ($a^-$) is 1, a preferable range of the total amount of charges of the ions (the counter ions) which are charged with a polarity opposite to that of the particle group (($a^+$) or ($a^-$)) and are movable in the dispersion medium is the same as that in the particle group (1a).

Further, it is more preferable that the total amount of charges of the positively charged particle group ($a^+$) is greater than the total amount of charges of the ions (the counter ions) which are charged with a negative polarity and are movable in the dispersion medium, and the total amount of charges of the negatively charged particle group ($a^-$) is greater than the total amount of charges of the ions (the counter ions) which are charged with a positive polarity and are movable in the dispersion medium. Accordingly, an excellent memory property is obtained with respect to both of the particle groups having the positive polarity and the particle groups having the negative polarity.

Furthermore, as a positively charged particle group, two or more types of particle groups may be included, and in this case, it is preferable that one type of positively charged particle group among two or more types of positively charged particle groups satisfy a requirement that a total amount of charges of the one type of positively charged particle group is greater than the total amount of charges of the ions (the counter ions) which are charged with a negative polarity and are movable in the dispersion medium.

In addition, similarly, as a negatively charged particle group, two or more types of particle groups may be included, and in this case, it is preferable that one type of negatively charged particle group among two or more types of negatively charged particle groups satisfy a requirement that a total amount of charges of the one type of negatively charged particle group is greater than the total amount of the charges of the ions (the counter ions) which are charged with a positive polarity and are movable in the dispersion medium.

Further, when the two or more types of particle groups are included as the positively charged particle group, it is preferable that the positively charged particle group ($a^+$) be a particle group having the smallest surface charge density among the two or more types of positively charged particle groups. In addition, when the two or more types of particle groups are included as the negatively charged particle group, it is preferable that the negatively charged particle group ($a^-$) be a particle group having the smallest surface charge density among the two or more types of negatively charged particle groups.

Further, when the two or more types of particle groups are included as the positively charged particle group, it is preferable that the positively charged particle group ($a^+$) be a particle group having the largest volume average particle size among the two or more types of positively charged particle groups. In addition, when the two or more types of particle groups are included as the negatively charged particle group, it is preferable that the negatively charged particle group ($a^-$) be a particle group having the largest volume average particle size among the two or more types of negatively charged particle groups.

Measurement of Total Amount of Electric Charges of Ions (the Counter Ions) Movable in Dispersion Medium The total amount of charges of the ions (the counter ions) movable in the dispersion medium is measured by moving the particle group to the surface of the substrate according to the voltage application, then by causing a short-circuit between the electrodes, and by observing a current flowing between the electrodes. The ions (the counter ions) movable in the dispersion medium are moved according to an internal potential difference between the particle group and the ions, and at this time, the current flows between the electrodes. A value obtained by time integrating the current value is the total amount of charges of the ions (the counter ions) movable in the dispersion medium.

When the charge amount of the particle group and the total amount of charges of the ions (the counter ions) movable in the dispersion medium are identical to each other, the charge amount detected when the ions (the counter ions) movable in the entire dispersion medium are moved to the other substrate side is 50% of the total amount of charges of the system.

Control Method of Total Amount of Electric Charges of Ions (the Counter Ions) Movable in Dispersion Medium A method of controlling the total amount of charges of the ions (the counter ions) movable in the dispersion medium is not particularly limited, and as the method, for example, the following two methods are included.

(1) A method in which when the positively charged particle group and the negatively charged particle group are included in the display dispersion, the positively charged counter ions and the negatively charged counter ions included in the display dispersion are bonded and removed, is included.

Figure 2A:
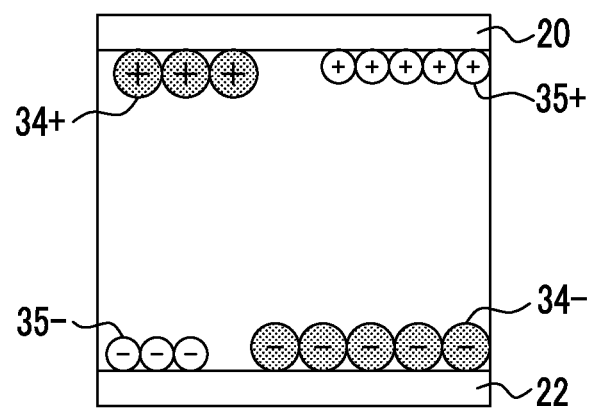
FIG. 2A is a conceptual diagram for describing a method of bonding and removing positively charged counter ions and negatively charged counter ions included in a dispersion for display.
Figure 2B:
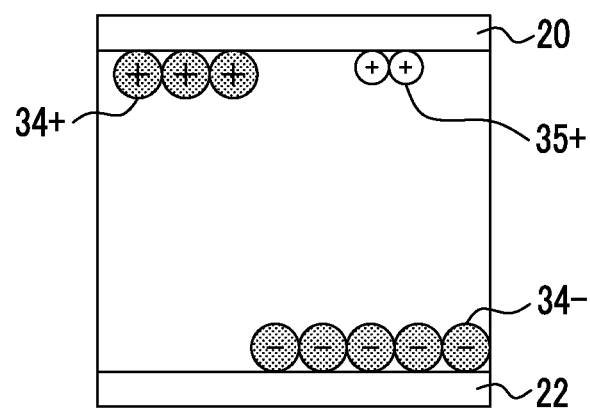
FIG. 2B is a conceptual diagram for describing a method of bonding and removing positively charged counter ions and negatively charged counter ions included in the dispersion for display.

As illustrated in FIG. 2A, when there are a positively charged particle group 34+ and a negatively charged particle group 34− having a different charge polarity in the system, there are counter ions having a total amount of charges identical to that of the respective particle groups and a polarity different from that of the respective particle groups, that is, negatively charged counter ions 35− and positively charged counter ions 35+. The counter ions are bonded to be a pair of a positive and negative charge, and are removed by being electrically neutralized, and thus as illustrated in FIG. 2B, the counter ions in the system are able to be decreased. Furthermore, even when total amounts of charges (an absolute value) of the positively charged particle group 34+ and the negatively charged particle group 34− are different from each other, the counter ions (in FIG. 2A, the positively charged counter ions 35+) corresponding to the particle group (in FIG. 2A, the negatively charged particle group 34−) having a large total amount of charges are able to be also decreased.

Furthermore, as a method of bonding and removing the positively charged counter ions and the negatively charged counter ions, a method in which the positively charged counter ions and the negatively charged counter ions are bonded by stirring the display dispersion, and the neutralized counter ions are floated by performing centrifugal separation as necessary, and are removed, is included.

In addition, a method in which a dissociation property between the counter ions and the particle group is improved, and thus the counter ions having a different polarity are bonded, is included. Specifically, a dissociation property between the counter ions and the particle group tends to be improved as the size (a particle size) of the counter ions becomes larger.

(2) A method in which in the display dispersion enclosed in the region interposed between the pair of substrates in the display medium, a surface layer trapping the ions (the counter ions) movable in the dispersion medium is disposed on at least one surface among surfaces of the display medium which are in contact with the dispersion medium, is included. As the surface in contact with the dispersion medium, a surface of the pair of substrates which is in contact with the dispersion medium, or when a partition wall partitioning the region interposed between the pair of substrates into plural regions in a surface direction is included, a surface of the partition wall which is in contact with the dispersion medium, is included. A specific configuration of the surface layer will be described later.

Next, the display dispersion according to this exemplary embodiment will be described together with a configuration of a display medium and a display device using the display dispersion.

Hereinafter, this exemplary embodiment will be described with reference to the drawings, and the same reference numerals are applied to members having the same performance and the same function through the entirety of drawings, and thus the repeated description will be omitted.

First Exemplary Embodiment

Figure 3:
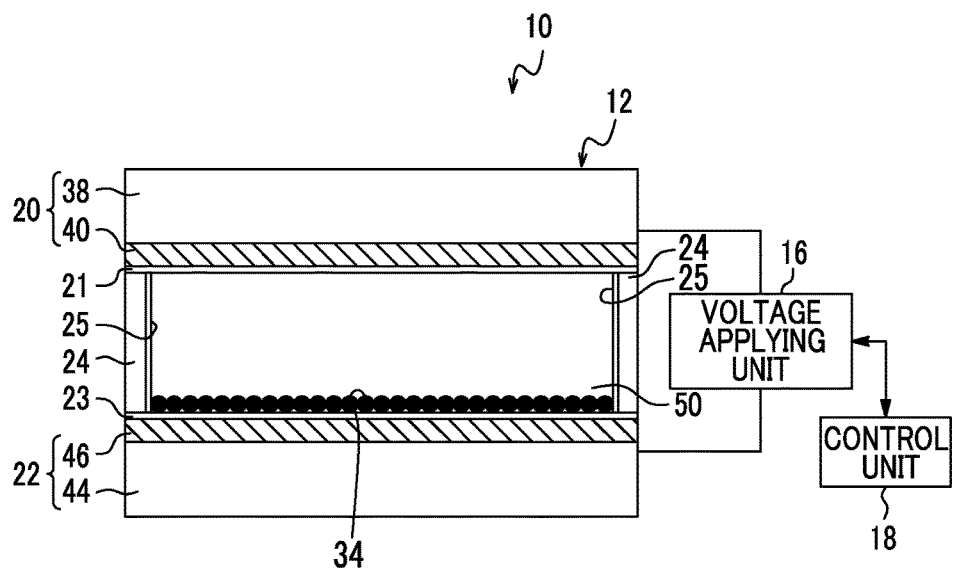
FIG. 3 is a schematic configuration diagram of a display device according to a first exemplary embodiment.
Figure 4A:
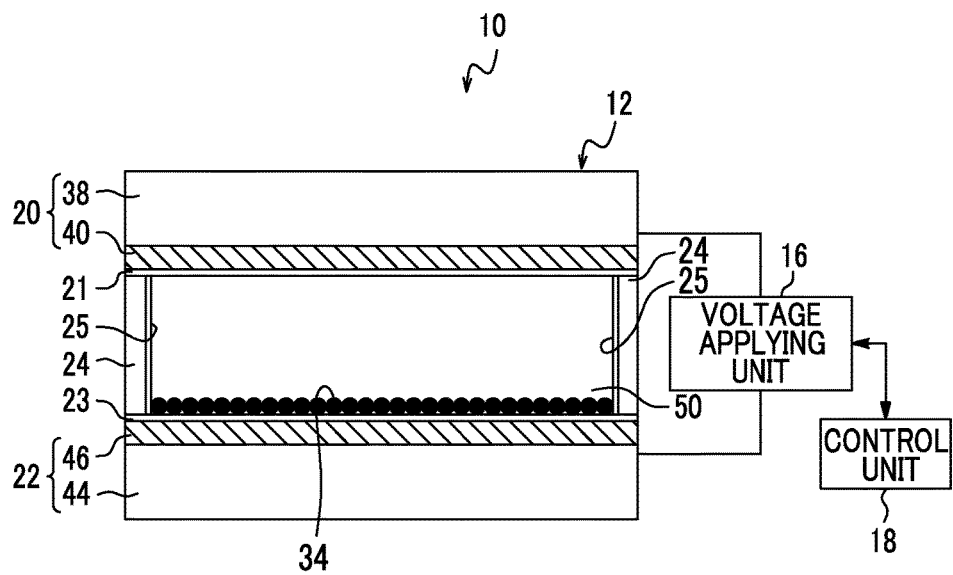
FIG. 4A is an explanatory diagram schematically illustrating a mode of movement of the particle group when a voltage is applied between the substrates of a display medium of the display device according to the first exemplary embodiment.
Figure 4B:
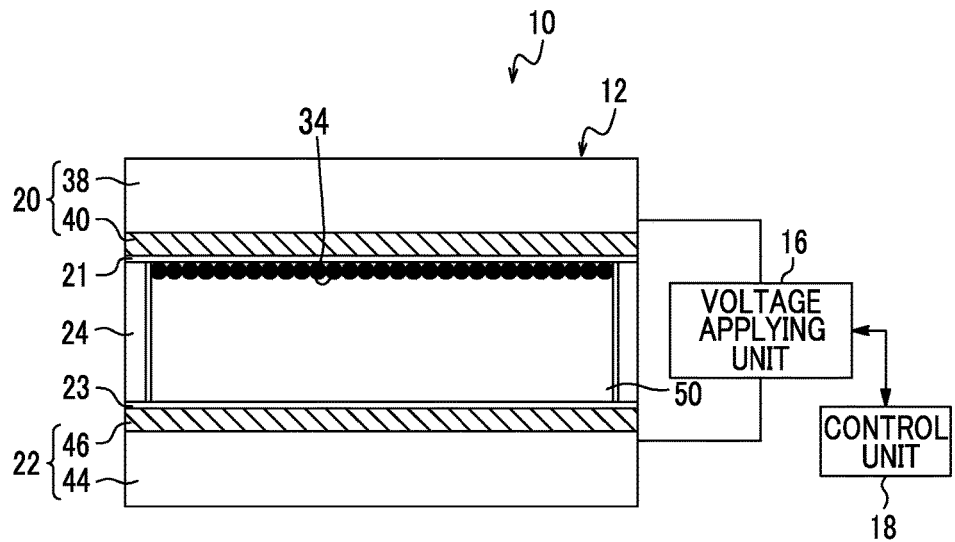
FIG. 4B is an explanatory diagram schematically illustrating a mode of movement of the particle group when a voltage is applied between the substrates of the display medium of the display device according to the first exemplary embodiment.

FIG. 3 is a schematic configuration diagram of a display device according to a first exemplary embodiment. FIG. 4A and FIG. 4B are explanatory diagrams schematically illustrating a mode of movement of the particle group when a voltage is applied between the substrates of the display medium of the display device according to the first exemplary embodiment.

As illustrated in FIG. 3, a display device 10 according to the first exemplary embodiment includes a display medium 12, a voltage applying unit 16 applying a voltage to the display medium 12, and a control unit 18.

The display medium 12 includes a display substrate 20 which is an image display surface, a back substrate 22 facing the display substrate 20 with a gap therebetween, a partition wall (a gap member) 24 which keeps the substrates at a predetermined interval, and partitions a region between the display substrate 20 and the back substrate 22 into plural cells, and a particle group 34 enclosed in each cell. In addition, the display medium 12 may include a floating particle group (not illustrated) having an optical reflection property different from that of the particle group 34.

The cell indicates a region surrounded by the display substrate 20, the back substrate 22, and the partition wall (gap member) 24. In the cell, a dispersion medium 50 is enclosed. The particle group 34 (the detail will be described later) is configured of plural particles, is dispersed in the dispersion medium 50, and is moved between the display substrate 20 and the back substrate 22 according to the electric field intensity formed in the cell. Furthermore, when the display medium 12 includes the floating particle group, the particle group 34 is moved through the gap between the floating particle groups.

Furthermore, in this exemplary embodiment, a case where the particle group 34 enclosed in one cell has a predetermined color, and is prepared by being subjected to a positive or negative charging treatment in advance is described.

Furthermore, the partition wall (the gap member) 24 is disposed so as to correspond to each pixel when an image is displayed on the display medium 12, and the cells are formed to correspond to the respective pixels, and thus the display medium 12 may be configured to perform display of each pixel.

In addition, in this exemplary embodiment, in order to simplify the description, this exemplary embodiment is described with reference to the drawing mainly illustrating one cell. Hereinafter, each configuration will be described in detail.

Substrate

First, the pair of substrates will be described. The display substrate 20 is configured by laminating a surface electrode 40 on a support substrate 38. The back substrate 22 is configured by laminating a back surface electrode 46 on a support substrate 44.

The display substrate 20, or both of the display substrate 20 and the back substrate 22 have translucency. Here, "translucency" in this exemplary embodiment indicates that transmissivity of visible light is greater than or equal to 60%.

As the support substrate 38 and the support substrate 44, glass, or plastic, for example, a polyethylene terephthalate resin, a polycarbonate resin, an acrylic resin, a polyimide resin, a polyester resin, an epoxy resin, a polyether sulfone resin, and the like are included.

In the surface electrode 40 and the back surface electrode 46, oxides of indium, tin, cadmium, antimony, and the like, complex oxide such as ITO, metal such as gold, silver, copper, and nickel, an organic material such as a polypyrrole and a polythiophene, and the like are used. These electrodes are used as a single layer film, a mixed film, or a composite film, and are formed by a vapor deposition method, a sputtering method, a coating method, and the like. In addition, according to the vapor deposition method, and the sputtering method, a thickness thereof is generally from 100 Å to 2000 Å. The back surface electrode 46 and the surface electrode 40 may be formed in a desired pattern, for example, in the shape of a matrix, or in the shape of a stripe enabling passive matrix drive to be performed by a known method of the related art such as etching of a liquid crystal display medium or a print substrate of the related art.

In addition, the surface electrode 40 may be embedded in the support substrate 38. In addition, the back surface electrode 46 may be embedded in the support substrate 44. In this case, a material of the support substrate 38 and the support substrate 44 is selected according to a composition of the respective particles of the particle group 34, and the like.

Furthermore, the back surface electrode 46 and the surface electrode 40 may be separated from the display substrate 20 and the back substrate 22, respectively, and may be arranged outside the display medium 12.

Furthermore, in the above description, though a case where both of the display substrate 20 and the back substrate 22 are provided with the electrode (the surface electrode 40 and the back surface electrode 46) is described, only any one of the substrates may be provided with the electrode, and thus may be configured to perform active matrix drive.

In addition, in order to obtain a configuration enabling the active matrix drive to be performed, the support substrate and the support substrate 44 may include a thin film transistor (TFT) in each pixel. Because it is easy to laminate wiring and to mount a component, it is preferable that TFT be formed on the back substrate 22 but not on the display substrate.

Surface Layer

In this exemplary embodiment, it is preferable that the surface layer trapping the ions (the counter ions) movable in the dispersion medium be disposed on a surface in contact with the dispersion medium, that is, at least one surface of surfaces of the display substrate 20, the back substrate 22, and the partition wall 24 which are in contact with the dispersion medium from a viewpoint of controlling the total amount of charges of the ions (the counter ions) movable in the dispersion medium to a required range.

In FIG. 3, a surface layer 21 and the surface layer 23 are disposed on facing surfaces of the display substrate 20 and the back substrate 22, respectively. In addition, a surface layer 25 is disposed on a surface (a surface inside the cell) of the partition wall (the gap member) 24.

Furthermore, in this exemplary embodiment, a case where the surface layer (each of the surface layer 21 and the surface layer 23) is disposed on both facing surfaces of the display substrate 20 and the back substrate 22 is described, but the surface layer may be disposed on only any one of the facing surfaces of the display substrate 20 and the back substrate 22, and it is preferable that the surface layer 21 be disposed on at least a facing surface on the display substrate 20 side. In addition, it is preferable that the surface layer 25 be disposed on the surface (the surface inside the cell) of the partition wall (the gap member) 24. That is, it is preferable that the surface layer be disposed on at least the facing surface of the display substrate 20, and it is most preferable that the surface layer be disposed on all of the pair of substrates and the partition wall (the gap member) (that is, an inner wall of the cell surrounded by the substrates and the partition wall).

As the surface layer trapping the ions (the counter ions) movable in the dispersion medium, for example, a surface layer including the following material is included.

Surface Layer Having Structure Trapping Negatively Charged Ions (Anions)

As a material capable of trapping negatively charged ions (anions), amide, a porphyrin, peptide, (thio)urea, a Lewis acid (for example, a phenyl boronic acid), carbamate, halogen, and conjugated structure (a π bond), are included.

Furthermore, as a mechanism in which the negatively charged ions (the anions) are trapped, it is considered that the negatively charged ions are trapped in an unoccupied orbital of the respective materials described above.

Among the materials described above, a Lewis acid, and urea are particularly preferable as the structure trapping the negatively charged ions (the anions).

Surface Layer Having Structure Trapping Positively Charged Ions (Cations)

As a material capable of trapping positively charged ions (cations), ether, conjugated structure (a π bond), phenol, thiol, thioanisole, triisopropyl silane are included.

Furthermore, as a mechanism in which the positively charged ions (the cations) are trapped, it is considered that the positively charged ions (the cations) are trapped by a hydrogen bond, hydrophobic interaction, π-π interaction, and multi-point interaction as a combination thereof.

Among the materials described above, ether is particularly preferable as the structure trapping the positively charged ions (the cations).

Furthermore, by using a material having a conjugated structure (a π bond) in the surface layer, the surface layer has a structure trapping the negatively charged ions (the anions) and the positively charged ions (the cations).

The surface layer is formed as follows.

The material capable of trapping the negatively charged ions or the positively charged ions is dissolved in a solvent, and is applied on the substrate by using a spin coater, a dip coater, or the like. After that, the solvent is dried, and thus the surface layer is formed. When the material capable of trapping the negatively charged ions or the positively charged ions is dissolved in the solvent, it is effective that a cross-linking agent is added in order to increase strength of the surface layer.

A thickness of the surface layer is preferably from 0.001 μm to 10 μm, and is more preferably from 0.01 μm to 1 μm.

Partition Wall (Gap Member)

Next, the partition wall (gap member) will be described. The partition wall (the gap member) 24 for keeping a gap between the display substrate 20 and the back substrate 22 is formed in order not to impair translucency of the display substrate 20, and is formed of a thermoplastic resin, a thermosetting resin, an electron beam curable resin, a photocurable resin, rubber, metal, and the like.

The partition wall (the gap member) 24 may be integrated with any one of the display substrate 20 and the back substrate 22. In this case, the partition wall (the gap member) 24 is prepared by performing an etching treatment etching the support substrate 38 or the support substrate 44, laser processing, press working using a mold prepared in advance, a printing treatment, and the like.

In this case, the partition wall (the gap member) 24 is prepared on either or both of the display substrate 20 side and the back substrate 22 side.

The partition wall (the gap member) 24 may be chromatic or achromic, and it is preferable that the partition wall (the gap member) 24 be colorless and transparent in order not to adversely influence a display image displayed on the display medium 12, and in this case, for example, a transparent resin such as a polystyrene, a polyester, or acryl, and the like are used.

In addition, it is preferable that the partition wall (the gap member) 24 in the shape of a particle be also transparent, and glass particles are also used in addition to transparent resin particles of a polystyrene, a polyester, acryl, and the like.

Furthermore, "transparent" indicates that transmissivity with respect to visible light is greater than or equal to 60%.

Dispersion Medium

Next, the dispersion medium will be described. As the dispersion medium 50 in which the particle group 34 is dispersed, an insulating liquid is preferable. Here, "insulating" indicates that volume specific resistance is greater than or equal to $10^{11}$ Ωcm. The same applies hereinafter.

As the insulating liquid described above, specifically, hexane, cyclohexane, toluene, xylene, decane, hexadecane, kerosene, paraffin, isoparaffin, silicone oil, dichloroethylene, trichlorethylene, perchlorethylene, high-purity oil, ethylene glycol, alcohols, ethers, esters, dimethyl formamide, dimethyl acetamide, dimethyl sulfoxide, N-methyl pyrrolidone, 2-pyrrolidone, N-methyl formamide, acetonitrile, tetrahydrofuran, propylene carbonate, ethylene carbonate, benzene, diisopropyl naphthalene, olive oil, isopropanol, trichlorotrifluoroethane, tetrachloroethane, dibromotetrafluoroethane, and the like, or a mixture thereof are preferably used. Among them, silicone oil may preferably be applied.

In addition, by removing impurities such that the following volume resistance value is obtained, and thus water (so-called pure water) is preferably used as the dispersion medium 50. The volume resistance value is preferably greater than or equal to $10^3$ Ωcm, is more preferably from $10^7$ Ωcm to $10^{19}$ Ωcm, and further preferably from $10^{10}$ Ωcm to $10^{19}$ Ωcm.

Furthermore, an acid, an alkali, a salt, dispersion stabilization agent, a stabilization agent for antioxidization, ultraviolet absorption, or the like, an antimicrobial agent, and antiseptic agent, and the like may be added to the insulating liquid, and may preferably be added such that a specific range of the volume resistance value is obtained.

In addition, as a charge-controlling agent, an anionic surfactant, a cationic surfactant, an amphoteric surfactant, a nonionic surfactant, a fluorine surfactant, a silicone surfactant, metal soap, alkyl phosphate esters, succinimides, and the like may be used by being added to the insulating liquid.

As the ionic and nonionic surfactants, more specifically, the followings are included. As the nonionic surfactant, polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, and the like are included. As the anionic surfactant, alkyl benzene sulfonate, alkyl phenyl sulfonate, alkyl naphthalene sulfonate, a higher fatty acid salt, a sulfuric acid ester salt of higher fatty acid ester, a sulfonic acid of higher fatty acid ester, and the like are included. As the cationic surfactant, a primary to a tertiary amine salts, a quaternary ammonium salt, and the like are included. These charge-controlling agents are preferably from 0.01% by weight to 20% by weight with respect to solid content of the particles, and are particularly preferably from 0.05% by weight to 10% by weight.

Furthermore, as the dispersion medium 50, the insulating liquid may be used together with polymeric resin. As the polymeric resin, polymer gel, a high molecular polymer, and the like are preferable.

As the polymeric resin, polymer gel derived from a natural polymer such as agarose, agaropectin, amylose, sodium alginate, propylene glycol alginate, isolichenan, insulin, ethyl cellulose, ethyl hydroxyethyl cellulose, curdlan, casein, carrageenan, carboxymethyl cellulose, carboxymethyl starch, callose, agar, chitin, chitosan, silk fibroin, guar gum, quince seed, crown gall polysaccharide, glycogen, glucomannan, keratan sulfate, keratin protein, collagen, cellulose acetate, gellan gum, schizophyllan, gelatin, ivory palm mannan, tunicin, dextran, dermatan sulfate, starch, tragacanth gum, nigeran, hyaluronic acid, hydroxyethyl cellulose, hydroxypropyl cellulose, pusutsran, funoran, decomposed xyloglucan, pectin, porphyran, methyl cellulose, methyl starch, laminaran, lichenan, lentinan, and locust bean gum, and almost all polymer gels of a synthetic polymer are included.

Further, as the polymeric resin, a polymer having a functional group such as alcohol, ketone, ether, ester, and amide in a repeating unit, and the like are included, and for example, polyvinyl alcohol, a poly(meth)acrylamide, and a derivative thereof, polyvinyl pyrrolidone, polyethylene oxide, and a copolymer including these polymers are included. Among them, gelatin, polyvinyl alcohol, a poly(meth)acrylamide, and the like are preferably used.

In addition, by mixing the following coloring agent into the dispersion medium 50, a color different from a color of the particle group 34 may be displayed on the display medium 12. For example, in a case where a coloring agent exhibiting a white color is mixed as the coloring agent, when the color of the particle group 34 is a black color, the white color and the black color are displayed on the display medium 12.

As the coloring agent mixed into the dispersion medium 50, a known coloring agent such as carbon black, titanium oxide, magnesium oxide, zinc oxide, a copper phthalocyanine cyan color material, an azo yellow color material, an azo magenta color material, a quinacridone magenta color material, a red color material, a green color material, and a blue color material are included. Specifically, aniline blue, calco oil blue, chrome yellow, ultramarine blue, Dupont oil red, quinoline yellow, methylene blue chloride, phthalocyanine blue, malachite green oxalate, lamp black, rose bengal, C.I. Pigment Red 48:1, C.I. Pigment Red 122, C.I. Pigment Red 57:1, C.I. Pigment Yellow 97, C.I. Pigment Blue 15:1, C.I. Pigment Blue 15:3, and the like are representatively included.

The particle group 34 is moved in the dispersion medium 50, and thus when viscosity of the dispersion medium 50 is greater than or equal to a predetermined value, a variation in a force with respect to the back substrate 22 and the display substrate 20 increases, and a threshold value of particles movement with respect to an electric field is not obtained, and thus it is preferable that the viscosity of the dispersion medium 50 be adjusted.

The viscosity of the dispersion medium 50 is preferably from 0.1 mPa·s to 100 mPa·s under an environment in which a temperature is 20° C. from a viewpoint of a movement speed of the particles, that is, a display speed, is more preferably from 0.1 mPa·s to 50 mPa·s, and is further preferably from 0.1 mPa·s to 20 mPa·s.

The viscosity of the dispersion medium 50 is adjusted by adjusting molecular weight, a structure, a composition, or the like of the dispersion medium. Furthermore, the viscosity is measured by using a B-8L type viscometer manufactured by Tokyo Keiki Inc.

Particle Group

Next, the particle group will be described. The particle group 34 is configured of plural particles, and the respective particles are charged with a positive polarity or negative polarity. In addition, a predetermined voltage is applied between the surface electrode 40 and the back surface electrode (that is, between the display substrate 20 and the back substrate 22), and an electric field having electric field intensity greater than or equal to predetermined electric field intensity is formed between the display substrate 20 and the back substrate 22, and thus the particle group 34 is moved in the dispersion medium 50.

A display color of the display medium 12 is changed due to the movement of the respective particles configuring the particle group 34 in the dispersion medium 50.

As the respective particles of the particle group 34, glass beads, insulating metal oxide particles such as alumina, and titanium oxide, thermoplastic or thermosetting resin particles, particles in which a coloring agent is fixed to a surface of these resin particles, particles containing a coloring agent in a thermoplastic or a thermosetting resin, metallic colloid particles having a plasmon color developing function, and the like are included.

As the thermoplastic resin used for manufacturing the particles, a homopolymer or a copolymer of styrenes such as styrene and chlorostyrene, a monoolefin such as ethylene, propylene, butylene, and isoprene, vinyl ester such as vinyl acetate, vinyl propionate, vinyl benzoate, and vinyl butyrate, α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate, vinyl ethers such as vinyl methyl ether, vinyl ethyl ether, and vinyl butyl ether, vinyl ketones such as vinyl methyl ketone, vinyl hexyl ketone, and vinyl isopropenyl ketone, and the like is exemplified.

In addition, as the thermosetting resin used for manufacturing the particles, a cross-linked resin such as a cross-linked copolymer including divinylbenzene as a main component and cross-linked polymethyl methacrylate, a phenol resin, a urea resin, a melamine resin, a polyester resin, a silicone resin, and the like are included. In particular, as a representative binder resin, a polystyrene, a styrene-acrylic acid alkyl copolymer, a styrene-methacrylic acid alkyl copolymer, a styrene-acrylonitrile copolymer, a styrene-butadiene copolymer, a styrene-maleic anhydride copolymer, a polyethylene, a polypropylene, a polyester, a polyurethane, an epoxy resin, a silicone resin, a polyamide, modified rosin, paraffin wax, and the like are included.

As the coloring agent, an organic or an inorganic pigment, oil soluble dye, and the like are used, and a magnetic powder such as magnetite, ferrite, or the like, and a known coloring agent such as carbon black, titanium oxide, magnesium oxide, zinc oxide, copper phthalocyanine cyan color material, an azo yellow color material, an azo magenta color material, a quinacridone magenta color material, a red color material, a green color material, and a blue color material are included. Specifically, aniline blue, calco oil blue, chrome yellow, ultramarine blue, Dupont oil red, quinoline yellow, methylene blue chloride, phthalocyanine blue, malachite green oxalate, lamp black, rose bengal, C.I. Pigment Red 48:1, C.I. Pigment Red 122, C.I. Pigment Red 57:1, C.I. Pigment Yellow 97, C.I. Pigment Blue 15:1, and C.I. Pigment Blue 15:3 are representatively exemplified.

A charge-controlling agent may be mixed into the resin particles. As the charge-controlling agent, a known charge-controlling agent used for an electrophotographic toner material is used, and for example, cetyl pyridyl chloride, a quaternary ammonium salt such as BONTRON P-51, BONTRON P-53, BONTRONE-84, and BONTRON E-81 (manufactured by Orient Chemical Industries Co., Ltd.), a salicylic acid metal complex, a phenolic condensate, a tetraphenyl compound, metal oxide particles, and metal oxide particles subjected to a surface treatment by various coupling agent are included.

A magnetic material may be mixed into an inner portion of the particles or the surface of the particles. As the magnetic material, a color-coated inorganic magnetic material or organic magnetic material is used. In addition, a transparent magnetic material, in particular, a transparent organic magnetic material is more preferable.

As the colored magnetic powder, for example, a colored magnetic powder having a small size disclosed in JP-A-2003-131420 may be used. A colored magnetic powder including magnetic particles as a core and a colored layer laminated on a surface of the magnetic particles is used. Then, as the colored layer, a colored layer which colors the magnetic powder to be impermeable by a pigment or the like may be selected, and for example, an optical interference thin film is preferably used. The optical interference thin film is a thin film formed of an achromatic color material such as $SiO_2$ or $TiO_2$ in a thickness identical to a wavelength of light, and reflects the light by optical interference in the thin film in a wavelength selective manner.

An external additive may be attached to the surface of the particles. It is preferable that a color of the external additive be transparent in order not to influence the color of the particles.

As the external additive, inorganic particles of metal oxide such as silicon oxide (silica), titanium oxide, and alumina, and the like are used. In order to adjust a charging property, fluidity, environment dependency, or the like of the particles, the particles may be subjected to a surface treatment by a coupling agent or silicone oil.

As the coupling agent, a positively charged coupling agent such as an aminosilane coupling agent, an amino titanium coupling agent, and a nitrile coupling agent, and a negatively charged coupling agent such as a silane coupling agent not containing a nitrogen atom (configured of atoms other than the nitrogen atom), a titanium coupling agent, an epoxy silane coupling agent, and an acrylic silane coupling agent are included. In addition, as the silicone oil, positively charged silicone oil such as amino-modified silicone oil, and negatively charged silicone oil such as dimethyl silicone oil, alkyl-modified silicone oil, α-methyl sulfone-modified silicone oil, methylphenyl silicone oil, chlorophenyl silicone oil, fluorine-modified silicone oil are included. These external additives are selected according to required resistance.

Among the external additives described above, well-known hydrophobic silica or hydrophobic titanium oxide is preferable, and in particular, $TiO(OH)_2$ disclosed in JP-A-10-3177, and a titanium compound obtained by being reacted with a silane compound such as a silane coupling agent are preferable. As the silane compound, any one of chlorosilane, alkoxysilane, silazane, and a special silylation agent may be used. The titanium compound is prepared by reacting $TiO(OH)_2$ prepared by a wet process with a silane compound or silicone oil, and by drying the reactant.

Primary particles of the external additive are generally from 1 nm to 100 nm, and are more preferable from 5 nm to 50 nm, but are not limited thereto.

A compounding ratio between the external additive and the particles is adjusted according to a balance between a particle size of the particles and a particle size of the external additive. In general, an amount of the external additive is from 0.01 parts by weight to 3 parts by weight with respect to 100 parts by weight of the particles, and is preferably from 0.05 parts by weight to 1 part by weight.

The external additive may be added to only one type of particles among various types of particles, or may be added to plural types of or all types of particles. When the external additive is added to the surface of all particles, it is preferable that the external additive be implanted to surface of the particles with an impulsive force, or the external additive be strongly fixed to the surface of the particles by heating the surface of the particles.

As a method of preparing the particle group 34, any known method of the related art may be used. For example, as disclosed in JP-A-7-325434, a method in which a resin, a pigment, and a charge-controlling agent are weighed to be a predetermined mixing ratio, the resin is heated and melted, the pigment is added and mixed into the resin and dispersed, and the mixture is cooled, then the particles are prepared by using a pulverizer such as a jet mill, a hammer mill, and a turbo mill, and then the obtained particles are dispersed in the dispersion medium is used.

In addition, particles containing the charge-controlling agent therein may be prepared by using a polymerization method such as a suspension polymerization, an emulsion polymerization, and a dispersion polymerization, or coacervation, melt dispersion, and an emulsion aggregation method, then may be dispersed in the dispersion medium, and thus a particles dispersion medium may be prepared.

In addition, a method in which the resin is easily plasticized, and a suitable device dispersing and kneading a raw material of the resin, the coloring agent, the charge-controlling agent, and the dispersion medium at a temperature lower than a decomposition point of at least one of the resin, the charge-controlling agent, and the coloring agent at which the dispersion medium is not boiled is used, is included. Specifically, the pigment, the resin, and the charge-controlling agent are heated and melted in the dispersion medium by a meteor type mixer, a kneader, or the like, and the melted mixture is cooled while being stirred by using temperature dependency of solvent solubility of the resin, then is solidified and precipitated, and thus particles are prepared.

In addition, a method in which the raw materials described above are put into a suitable container provided with granular media for dispersing and kneading, for example, an attritor, and a heated vibration mill such as a heated ball mill, and the materials in the container are dispersed and kneaded at a desired temperature range, for example, from 80° C. to 160° C. may be used. As the granular media, steel such as stainless steel and carbon steel, alumina, zirconia, silica, and the like are preferably used. In order to prepare the particles according to this method, the raw materials which are in a fluid state in advance are further dispersed in the container by the granular media, then the dispersion medium is cooled, and thus the resin including the coloring agent is precipitated from the dispersion medium. The granular media generate shear or impulse to make the particle size small while being continuously in a driving state during the cooling and after the cooling.

A content of the particle group 34 (a content with respect to entire weight in the cell (% by weight)) is not particularly limited insofar as a concentration with which a desired color phase is obtained is given, and adjusting the content according to a thickness of the cell (that is, a distance between the display substrate 20 and the back substrate 22) is effective as the display medium 12. That is, in order to obtain a desired color phase, the content decreases as the cell becomes thicker, and the content increases as the cell becomes thinner. In general, the content is from 0.01% by weight to 50% by weight.

Floating Particle Group

Next, the floating particle group will be described. The floating particle group is a particle group which is not charged, is configured of colored particles having an optical reflection property different from that of the particle group 34, and functions as a reflective member displaying a color different from that of the particle group 34.

Specifically, the floating particle group, for example, is a member which is colored into the color different from that of the particle group 34, and allows the display medium 12 to display the color different from the color of the particle group 34. In this exemplary embodiment, a case where the floating particle group is in a white color is described, but the color is not limited thereto.

As the floating particle group, for example, particles in which a white color pigment such as titanium oxide, silicon oxide, and zinc oxide is dispersed in a polystyrene, a polyethylene, a polypropylene, a polycarbonate, PMMA, an acrylic resin, a phenol resin, a formaldehyde condensate, and the like, are used. In addition, when particles other than white color particles are applied as the particles configuring the colored member, for example, the resin particles described above which include a pigment or a dye of a desired color may be used. As the pigment or the dye, for example, a general pigment or dye which is used for a printing ink or a color toner may be used insofar as it is in an RGB color or a YMC color.

The floating particle group is enclosed between the substrates, for example, by using an ink jet method or the like.

A size of the cell in the display medium 12 has a close relationship with resolution of the display medium 12, and as the cell becomes smaller, the display medium 12 which is able to display higher resolution image is prepared, in general, a length of the display substrate 20 of the display medium 12 in a plate surface direction is from 10 μm to 1 mm.

In order to fix the display substrate 20 and the back substrate 22 to each other through the partition wall (the gap member) 24, a fixing unit such as a combination of a bolt and a nut, a clamp, a clip, and a frame for fixing a substrate is used. In addition, a fixing unit such as an adhesive agent, thermal fusion, ultrasonic bonding may be used.

The display medium 12 configured as described above, for example, is used for a bulletin board, a circulation plate, an electronic blackboard, an advertisement, a signboard, a blinking sign, an electronic paper, an electronic newspaper, an electronic book, a document sheet which is able to be shared with a copying machine and a printer, and the like in which an image is able to be preserved and rewritten.

The above-described display device 10 according to this exemplary embodiment includes the display medium 12, the voltage applying unit 16 applying a voltage to the display medium 12, and the control unit 18 (refer to FIG. 3).

The voltage applying unit 16 is electrically connected to the surface electrode 40 and the back surface electrode 46. Furthermore, in this exemplary embodiment, a case where both of the surface electrode 40 and the back surface electrode 46 are electrically connected to the voltage applying unit 16 is described, but one of the surface electrode 40 and the back surface electrode 46 may be grounded, and the other may be connected to the voltage applying unit 16.

The voltage applying unit 16 is connected so that it may transfer a signal to and from the control unit 18.

The control unit 18 may be configured as a microcomputer including a central processing unit (CPU) managing an operation of the entire device, a random access memory (RAM) temporarily storing various data items, and a read only memory (ROM) in which various programs such as a control program controlling the entire device are stored in advance.

The voltage applying unit 16 is a voltage applying device for applying a voltage to the surface electrode 40 and the back surface electrode 46, and a voltage according to the control of the control unit 18 is applied between the surface electrode 40 and the back surface electrode 46.

Next, a performance of the display device 10 will be described. The performance will be described according to an operation of the control unit 18.

Here, a case where the particle group 34 enclosed in the display medium 12 is in a black color and is charged with a negative polarity will be described. In addition, a case where the dispersion medium 50 is transparent, and the floating particle group is in a white color will be described. That is, in this exemplary embodiment, a case where the display medium 12 displays a black color or a white color according to the movement of the particle group 34 will be described.

First, an initial operation signal indicating that a voltage is applied for a predetermined period of time such that the surface electrode 40 is set to be a negative electrode and the back surface electrode 46 is set to be a positive electrode is output to the voltage applying unit 16. When a voltage greater than or equal to a threshold voltage at which the region between the substrates is charged with a negative polarity and a concentration variation is finished is applied, the particles configuring the particle group 34 charged with the negative polarity are moved to the back substrate 22 side, and thus reach the back substrate 22 (refer to FIG. 4A).

At this time, the color of the display medium 12 which is viewed from the display substrate 20 side is viewed as a white color which is the color of the floating particle group.

The predetermined period of time may be stored in a memory such as a ROM (not illustrated) in the control unit 18, or the like in advance as information indicating a voltage application time of the voltage applied in the initial operation. Then, at the time of executing processing, the information indicating the predetermined period of time may be read out.

Next, when a voltage is applied such that the surface electrode 40 is set to be a positive electrode and the back surface electrode 46 is set to be a negative electrode by inverting a polarity from that of the voltage applied between the surface electrode 40 and the back surface electrode 46, as illustrated in FIG. 4B, the particle group 34 is moved to the display substrate 20 side, and reaches the display substrate 20 side, and thus black display is performed by the particle group 34.

Thus, in the display device 10 according to this exemplary embodiment, the particle group 34 reaches the display substrate 20 or the back substrate 22, and is attached thereto, and thus the display is performed.

Then, a configuration in which at least one surface of the surfaces of the display substrate 20, the back substrate 22, and the partition wall 24 which are in contact with the dispersion medium is provided with at least one of the surface layers 21 and 23, and 25 trapping the ions (the counter ions) movable in the dispersion medium, thus the ions (the counter ions) movable in the dispersion medium are trapped, and the total amount of charges of the particle group 34 is greater than the total amount of charges of the ions (the counter ions) which are charged with a polarity opposite to that of the particle group 34 and are movable in the dispersion medium is attained. As a result thereof, a display medium having an excellent memory property is obtained.

Second Exemplary Embodiment

Figure 5:
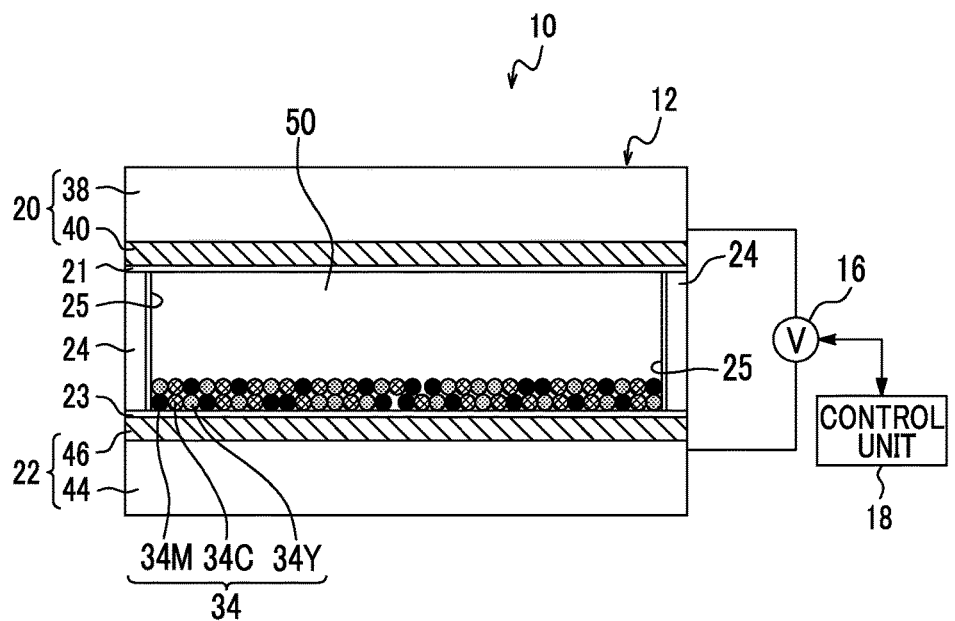
FIG. 5 is a schematic configuration diagram of a display device according to a second exemplary embodiment.
Figure 6:
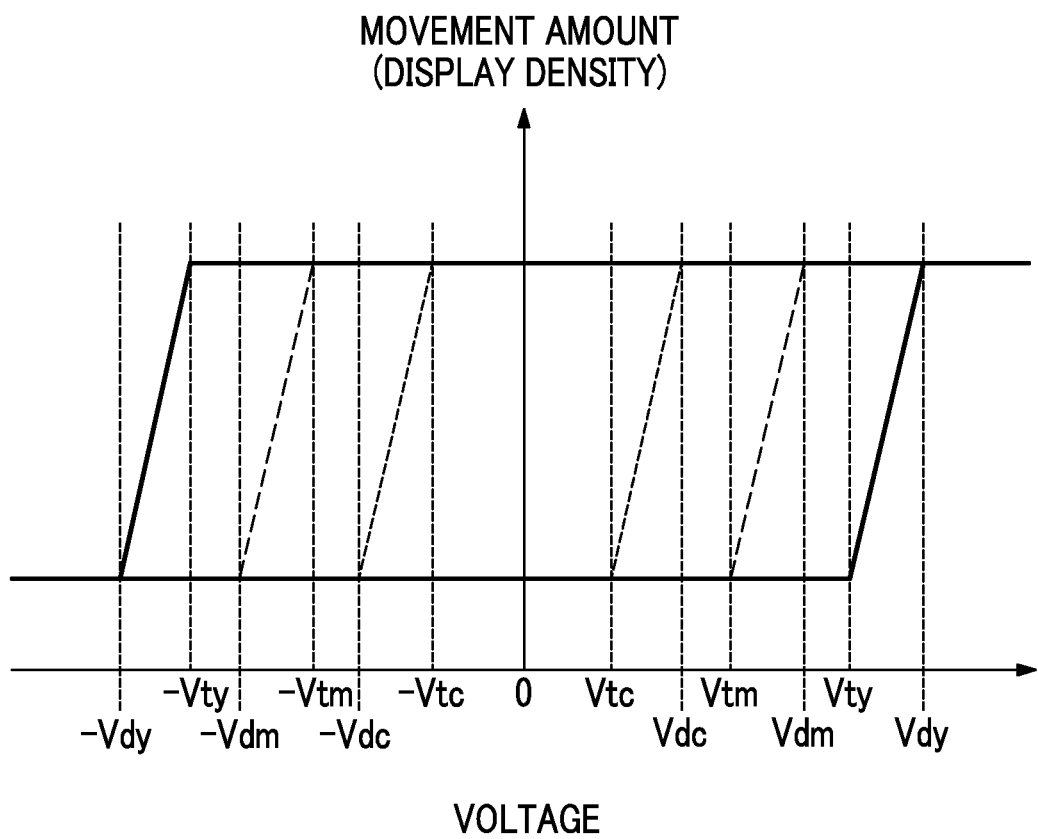
FIG. 6 is a diagrammatic view schematically illustrating a relationship between a voltage to be applied and a movement amount of the particles (display density) in the display device according to the second exemplary embodiment.

FIG. 5 is a schematic configuration diagram of a display device according to a second exemplary embodiment. FIG. 6 is a diagrammatic view schematically illustrating a relationship between a voltage to be applied and a movement amount of the particles (display density) in the display device according to the second exemplary embodiment. FIG. 7 is an explanatory diagram schematically illustrating a relationship between a mode of voltage to be applied between the substrates of the display medium and a mode of movement of the particles in the display device according to the second exemplary embodiment.

Two or more types of particle groups are applied to the display device 10 according to the second exemplary embodiment. Furthermore, all of the two or more types of particle groups are charged with the same polarity. Then, a total amount of charges of one type of particle group among the two or more types of particle groups charged with the same polarity is greater than the total amount of charges of the ions (the counter ions) which are charged with a polarity opposite to that of the particle group and are movable in the dispersion medium.

The display device 10 according to this exemplary embodiment, as illustrated in FIG. 5, includes the display medium 12, the voltage applying unit 16 applying a voltage to the display medium 12, and the control unit 18.

Furthermore, the display device 10 according to this exemplary embodiment has substantially the same configuration as that of the display device 10 described in the first exemplary embodiment described above, and thus the same reference numerals are applied to the same configuration, and the detailed description thereof will be omitted.

The display medium 12 includes the display substrate 20 which is an image display surface, the back substrate 22 facing the display substrate 20 with a gap therebetween, the partition wall (the gap member) 24 which keeps the substrates at a predetermined interval, and partitions the region between the display substrate 20 and the back substrate 22 into plural cells, and the particle group 34 enclosed in each cell. In addition, the display medium 12 may include a floating particle group (not illustrated) having an optical reflection property different from that of the particle group 34.

The facing surfaces of the display substrate 20 and the back substrate 22 are subjected to a charging treatment as described in the first exemplary embodiment, the surface layer 21 and the surface layer 23 are disposed on the facing surfaces, respectively, and the surface layer 25 is disposed on the surface of the partition wall 24 which is in contact with the dispersion medium 50.

In this exemplary embodiment, as the particle group 34, various types of particle groups 34 having different colors from each other are dispersed in the dispersion medium 50.

Furthermore, in this exemplary embodiment, though a case where a yellow particle group 34Y having a yellow color, a magenta particle group 34M having a magenta color, and a cyan particle group 34C having a cyan color are dispersed as three types of particle groups 34 is described, the particle group is not limited to the three types of particle groups.

The various types of particle groups 34 are a particle group electrophoretically migrating between the substrates, and an absolute value of a voltage required to move the particle group according to an electric field is different in the particle groups having each color. That is, the particle groups 34 (the yellow particle group 34Y, the magenta particle group 34M, and the cyan particle group 34C) having each color have a voltage range required for moving the particle group 34 for each color, and the voltage range in each particle group is different from each other.

The respective particles of the various types of particle groups 34 having a different absolute value of the voltage required for moving the particle group according to the electric field are obtained by preparing each particle dispersion including particles having a different charge amount by changing, for example, an amount of the charge-controlling agent or the magnetic powder, a type or concentration of the resin configuring the particles, and the like among the materials configuring the particle group 34 described in the first exemplary embodiment described above, and by mixing the prepared particle dispersions.

Here, as described above, as the three types of particle groups 34, the yellow particle group 34Y, the magenta particle group 34M, and the cyan particle group 34C having colors different from each other are dispersed in the display medium 12 according to this exemplary embodiment, and each of the absolute values of the voltage required for moving the particle group according to the electric field is different among the particle groups having each color.

Furthermore, in this exemplary embodiment, a case where as an absolute value of a voltage at the time of starting the movement of the respective particle groups of three colors of the magenta particle group 34M having a magenta color, the cyan particle group 34C having a cyan color, and the yellow particle group 34Y having a yellow color, the magenta particle group 34M having a magenta color indicates |Vtm|, the cyan particle group 34C having a cyan color indicates |Vtc|, and the yellow particle group 34Y having a yellow color indicates |Vty| is described. In addition, a case where as an absolute value of a maximum voltage for moving almost all of the respective color particle groups 34 having of colors of the magenta particle group 34M having a magenta color, the cyan particle group 34C having a cyan color, and the yellow particle group 34Y having a yellow color, the magenta particle group 34M having a magenta color indicates |Vdm|, the cyan particle group 34C having a cyan color indicates |Vdc|, and the yellow particle group 34Y having a yellow color indicates |Vdy| is described.

Furthermore, as described below, a case where the absolute values of Vtc, −Vtc, Vdc, −Vdc, Vtm, −Vtm, Vdm, −Vdm, Vty, −Vty, Vdy, and −Vdy have a relationship of |Vtc|<|Vdc|<|Vtm|<|Vdm|<|Vty|<|Vdy| is described.

Specifically, as illustrated in FIG. 6, for example, in a state where all of the three types of particle groups 34 are charged with a homopolarity, the three types of particle groups 34 are dispersed in the dispersion medium 50, an absolute value |Vtc≤Vc≤Vdc| (an absolute value of values from Vtc to Vdc) of a voltage range required for moving the cyan particle group 34C, an absolute value |Vtm≤Vm≤Vdm| (an absolute value of values from Vtm to Vdm) of a voltage range required for moving the magenta particle group 34M, and an absolute value |Vty≤Vy≤Vdy| (an absolute value of values from Vty to Vdy) of a voltage range required for moving the yellow particle group 34Y are set to be increased in this order without being overlapped.

In addition, in order to independently drive the particle groups 34 having each color, the absolute value |Vdc| of a maximum voltage for moving almost all of the cyan particle group 34C is set to be smaller than the absolute value |Vtm≤Vm≤Vdm| (the absolute value of the values from Vtm to Vdm) of the voltage range required for moving the magenta particle group 34M and the absolute value |Vty≤Vy≤Vdy| (the absolute value of the values from Vty to Vdy) of the voltage range required for moving the yellow particle group 34Y. In addition, the absolute value |Vdm| of a maximum voltage for moving almost all of the magenta particle group 34M is set to be smaller than the absolute value |Vty≤Vy≤Vdy| (the absolute value of the values from Vty to Vdy) of the voltage range required for moving the yellow particle group 34Y.

That is, in this exemplary embodiment, the voltage ranges required for moving the particle groups 34 having each color are set not to be overlapped, and thus the particle groups 34 having each color are independently driven.

Furthermore, "the voltage range required for moving the particle group 34" indicates a voltage range between the voltage required for starting the movement of the particles and a voltage with which there is no change in display density even when the voltage and the voltage application time is increased from those at the start of the movement and display density is saturated.

In addition, "the maximum voltage required for moving almost all of the particle group 34" indicates a voltage with which there is no change in the display density even when the voltage and the voltage application time is further increased from those at the start of the movement, and the display density is saturated.

In addition, "almost all" indicates a state where there is a property variation in the particle groups 34 having each color, and thus a property of a part of the particle groups 34 varies to the extent of not contributing to a display property. That is, "almost all" indicates a state where there is no change in the display density even when the voltage and the voltage application time is further increased from those at the start of the movement, and the display density is saturated.

In addition, "display density" indicates density when a voltage is applied between the display surface side and the back surface side while color density on the display surface side is measured by a reflective densitometer of optical density (Optical Density=OD) manufactured by X-rite Inc., the voltage is slowly changed (the applied voltage increases or decreases) in a direction where the measured density increases, the density change in a unit voltage is saturated, and even when the voltage and the voltage application time increase in this state, there is no density change and the density is saturated.

Then, in the display medium 12 according to this exemplary embodiment, when a voltage from 0 V is applied between the display substrate 20 and the back substrate 22, a voltage value of the applied voltage slowly increases, and the voltage applied between the substrates exceeds +Vtc, a change in the display density due to the movement of the cyan particle group 34C in the display medium 12 begins to be visible. Further, when the voltage value increases, and the voltage applied between the substrates reaches +Vdc, a change in the display density due to the movement of the cyan particle group 34C in the display medium 12 is stopped.

Further, when the voltage value increases, and the voltage applied between the display substrate 20 and the back substrate 22 exceeds +Vtm, a change in the display density due to the movement of the magenta particle group 34M in the display medium 12 begins to be visible. Further, when the voltage value increases, and the voltage applied between the display substrate 20 and the back substrate 22 reaches +Vdm, a change in the display density due to the movement of the magenta particle group 34M in the display medium 12 is stopped.

Further, when the voltage value increases, and the voltage applied between the substrates exceeds +Vty, a change in the display density due to the movement of the yellow particle group 34Y in the display medium 12 begins to be visible. Further, when the voltage value increases, and the voltage applied between the substrates reaches +Vdy, a change in the display density due to the movement of the yellow particle group 34Y in the display medium 12 is stopped.

In contrast, when a voltage from 0 V to a negative voltage is applied between the display substrate 20 and the back substrate 22, an absolute value of the voltage slowly increases, and the absolute value exceeds the absolute value of the voltage −Vtc applied between the substrates, a change in the display density due to the movement of the cyan particle group 34C between the substrates in the display medium 12 begins to be visible. Further, when the absolute value of the voltage value increases, the voltage applied between the display substrate 20 and the back substrate 22 is greater than or equal to −Vdc, a change in the display density due to the movement of the cyan particle group 34C in the display medium 12 is stopped.

Further, when the absolute value of the voltage value increases, the negative voltage is applied, and the voltage applied between the display substrate 20 and the back substrate 22 exceeds the absolute value of −Vtm, a change in the display density due to the movement of the magenta particle group 34M in the display medium 12 begins to be visible. Further, when the absolute value of the voltage value increases, the voltage applied between the display substrate 20 and the back substrate 22 reaches −Vdm, a change in the display density due to the movement of the magenta particle group 34M in the display medium 12 is stopped.

Further, when the absolute value of the voltage value increases, the negative voltage is applied, and the voltage applied between the display substrate 20 and the back substrate 22 exceeds the absolute value of −Vty, a change in the display density due to the movement of the yellow particle group 34Y in the display medium 12 begins to be visible. Further, when the absolute value of the voltage value increases, and the voltage applied between the substrates reaches −Vdy, a change in the display density due to the movement of the yellow particle group 34Y in the display medium 12 is stopped.

That is, in this exemplary embodiment, as illustrated in FIG. 6, when a voltage within a range from −Vtc to +Vtc (a voltage range less than or equal to |Vtc|) is applied between the display substrate 20 and the back substrate 22, the particles of the particle groups 34 (the cyan particle group 34C, the magenta particle group 34M, and the yellow particle group 34Y) are not moved to the extent of causing a change in the display density of the display medium 12. Then, when a voltage greater than an absolute value of the voltage +Vtc and the voltage −Vtc is applied between the substrates, particles begin to be moved to the extent of causing a change in the display density of the display medium 12 with respect to the cyan particle group 34C among the particle groups 34 of three colors, a change in the display density begins to occur, and when a voltage greater than or equal to the absolute value |Vdc| of the voltage −Vdc and the voltage Vdc is applied, a change in the display density per unit voltage does not occur.

Further, when a voltage within a range from −Vtm to +Vtm (a voltage range less than or equal to |Vtm|) is applied between the display substrate 20 and the back substrate 22, the particles of the magenta particle group 34M and the yellow particle group 34Y are not moved to the extent of causing a change in the display density of the display medium 12. Then, when a voltage greater than an absolute value of the voltage +Vtm and the voltage −Vtm is applied between the substrates, with respect to the magenta particle group 34M among the magenta particle group 34M and the yellow particle group 34Y, the particles begin to be moved to the extent of causing a change in the display density of the display medium 12, and a change in the display density per unit voltage begins to occur, and when a voltage greater than or equal to the absolute value |Vdm| of the voltage −Vdm and the voltage Vdm is applied, a change in the display density does not occur.

Further, when a voltage within a range from −Vty to +Vty (a voltage range less than or equal to |Vty|) is applied between the display substrate 20 and the back substrate 22, the particles of the yellow particle group 34Y are not moved to the extent of causing a change in the display density of the display medium 12. Then, when a voltage greater than an absolute value of the voltage +Vty and the voltage −Vty is applied between the substrates, the particles begin to be moved to the extent of causing a change in the display density of the display medium 12 with respect to the yellow particle group 34Y, and a change in the display density begins to occur, and when a voltage greater than or equal to the absolute value |Vdy| of the voltage −Vdy and the voltage Vdy is applied, a change in the display density does not occur.

Next, with reference to FIG. 7, a mechanism of the movement of the particles when an image is displayed on the display medium 12 will be described.

For example, a case where as the various types of particle groups 34, the yellow particle group 34Y, the magenta particle group 34M, and the cyan particle group 34C which are described with reference to FIG. 6 are enclosed in the display medium 12 is described.

In addition, in the following description, a voltage applied between the substrates which is greater than the absolute value of the voltage required for starting the movement of the particles configuring the yellow particle group 34Y and less than or equal to the maximum voltage of the yellow particle group 34Y is referred to as a "high voltage", a voltage applied between the substrates which is greater than the absolute value of the voltage required for starting the movement of the particles configuring the magenta particle group 34M and less than or equal to the maximum voltage of the magenta particle group 34M is referred to as a "medium voltage", and a voltage applied between the substrates which is greater than the absolute value of the voltage required for starting the movement of the particles configuring the cyan particle group 34C and less than or equal to the maximum voltage of the cyan particle group 34C is referred to as a "low voltage".

In addition, when a voltage greater than that of the back substrate 22 side is applied to the display substrate 20 side between the substrates, the voltages are referred to as a "+high voltage", a "+medium voltage", and a "+low voltage", respectively. In addition, when a voltage greater than that of the display substrate 20 side is applied to the back substrate 22 side between the substrates, the voltages are referred to as a "−high voltage", a "−medium voltage", and a "−low voltage", respectively.

As illustrated in (A) of FIG. 7, in an initial state, in a case where all of the magenta particle group 34M, the cyan particle group 34C, and the yellow particle group 34Y as the entire particle groups are positioned on the back substrate 22 side (a white color display state), when the "+high voltage" is applied between the display substrate 20 and the back substrate 22 from this initial state, the magenta particle group 34M, the cyan particle group 34C, and the yellow particle group 34Y as the entire particle groups are moved to the display substrate 20 side. In this state, even when the voltage application is released, the respective particle groups remain attached to the display substrate 20 side and are not moved, and thus the particle groups are in a state where a black color is displayed by a subtraction color mixture (a subtraction color mixture of a magenta color, a cyan color, and a yellow color) due to the magenta particle group 34M, the cyan particle group 34C, and the yellow particle group 34Y (refer to (B) of FIG. 7).

Next, when the "−medium voltage" is applied between the display substrate 20 and the back substrate 22 from the state of (B) of FIG. 7, the magenta particle group 34M and the cyan particle group 34C among all the particle groups 34 of respective colors are moved to the back substrate 22 side. For this reason, the particle groups are in a state where only the yellow particle group 34Y is attached to the display substrate 20 side, and thus yellow color display is performed (refer to (C) of FIG. 7).

Further, when the "+low voltage" is applied between the display substrate 20 and the back substrate 22 from the state of (C) of FIG. 7, the cyan particle group 34C of the magenta particle group 34M and the cyan particle group 34C having been moved to the back substrate 22 side is moved to the display substrate 20 side. For this reason, the particle groups are in a state where the yellow particle group 34Y and the cyan particle group 34C are attached to the display substrate 20, and thus a green color due to a subtraction color mixture between a yellow color and a cyan color is displayed (refer to (D) of FIG. 7).

In addition, when the "−low voltage" is applied between the display substrate 20 and the back substrate 22 from the state of (B) of FIG. 7, the cyan particle group 34C among the entire particle groups 34 is moved to the back substrate 22 side. For this reason, the particle groups are in a state where the yellow particle group 34Y and the magenta particle group 34M are attached to the display substrate 20 side, and thus red color display due to a subtraction color mixture between a yellow color and a magenta color is performed (refer to (I) of FIG. 7).

On the other hand, when the "+medium voltage" is applied between the display substrate 20 and the back substrate 22 from the initial state illustrated in (A) of FIG. 7, the magenta particle group 34M and the cyan particle group 34C among the entire particle groups 34 (the magenta particle group 34M, the cyan particle group 34C, and the yellow particle group 34Y) are moved to the display substrate 20 side. For this reason, the particle groups are in a state where the magenta particle group 34M and the cyan particle group 34C are attached to the display substrate 20 side, and thus a blue color due to a subtraction color mixture between a magenta color and a cyan color is displayed (refer to (E) of FIG. 7).

When the "−low voltage" is applied between the display substrate 20 and the back substrate 22 from the state of (E) of FIG. 7, the particle groups are in a state where the cyan particle group 34C of the magenta particle group 34M and the cyan particle group 34C attached to the display substrate 20 side is moved to the back substrate 22 side.

For this reason, the particle groups are in a state where only the magenta particle group 34M is attached to the display substrate 20 side, and thus a magenta color is displayed (refer to (F) of FIG. 7).

When the "−high voltage" is applied between the display substrate 20 and the back substrate 22 from a state of (F) of FIG. 7, the magenta particle group 34M attached to the display substrate 20 side is moved to the back substrate 22 side.

For this reason, the particle groups are in a state where none of the particle groups is attached to the display substrate 20 side, and thus a white color as a color of the floating particle group is displayed (refer to (G) of FIG. 7).

In addition, when the "+low voltage" is applied between the display substrate 20 and the back substrate 22 from the initial state illustrated in (A) of FIG. 7, the cyan particle group 34C among the entire particle groups 34 (the magenta particle group 34M, the cyan particle group 34C, and the yellow particle group 34Y) is moved to the display substrate 20 side. For this reason, the cyan particle group 34C is attached to the display substrate 20 side, and thus a cyan color is displayed (refer to (H) of FIG. 7).

Further, when the "−high voltage" is applied between the display substrate 20 and the back substrate 22 from the state illustrated in (I) of FIG. 7, as illustrated in (G) of FIG. 7, the entire particle groups 34 are moved to the back substrate 22 side, and thus white color display is performed.

Similarly, when the "−high voltage" is applied between the display substrate 20 and the back substrate 22 from the state illustrated in (D) of FIG. 7, as illustrated in (G) of FIG. 7, the entire particle groups 34 are moved to the back substrate 22 side, and thus white color display is performed.

In this exemplary embodiment, by applying the voltage according to each of the particle groups 34 between the substrates, desired particles are selectively moved according to the electric field due to the voltage, and thus particles having a color other than a desired color is prevented from being moved in the dispersion medium 50, and the color other than the desired color is prevented from being mixed, and thus color display is performed. Furthermore, the respective particle groups 34 provide vivid color display insofar as the absolute values of the voltages required for moving the particle group according to the electric field are different from each other even when the voltage ranges required for moving the particle group according to the electric field are overlapped with each other, but when the voltage ranges are different from each other, a color mixture is further prevented, and thus color display is provided.

In addition, by dispersing the particle groups 34 having three colors of cyan, magenta, and yellow in the dispersion medium 50, a cyan color, a magenta color, a yellow color, a blue color, a red color, a green color, and a black color are displayed, and a white color is displayed by the floating particle group having a white color, and thus specific color display is provided.

Thus, in the display device 10 according to this exemplary embodiment, as illustrated in the display device 10 described in the first exemplary embodiment described above, the particle group 34 reaches the display substrate 20 or the back substrate 22, and attached thereto, and thus display is performed.

Then, a configuration in which at least one surface of the surfaces of the display substrate 20, the back substrate 22, and the partition wall 24 which are in contact with the dispersion medium is provided with at least one of the surface layers 21 and 23, and 25 trapping the ions (the counter ions) movable in the dispersion medium, thus the ions (the counter ions) movable in the dispersion medium are trapped, and the total amount of charges of the one type of particle group among the particle groups 34 is greater than the total amount of charges of the ions (the counter ions) which are charged with a polarity opposite to that of the particle group 34 and are movable in the dispersion medium is attained. As a result thereof, a display medium having an excellent memory property is obtained.

EXAMPLE

Hereinafter, the invention will be described in more detail with reference to Examples, but the invention is not limited to the following Examples.

Measuring Method

Measurement of Volume Average Particle Size of Particles (Particle Group)

A volume average particle size of the particles is measured by using Coulter Multisizer-II (manufactured by Beckman-Coulter Inc.) with an aperture diameter of 50 μm. At this time, the measurement is performed by dispersing the particles in an electrolyte aqueous solution (ISOTON aqueous solution, manufactured by Beckman-Coulter Inc.), and by dispersing the particles for 30 seconds or more by ultrasonic wave.

In the measuring method, 0.5 mg to 50 mg of a measurement sample is added to a surfactant as a dispersant, preferably 2 ml of an aqueous solution of 5% of sodium alkylbenzene sulfonate, and the obtained solution is added to 100 ml to 150 ml of an electrolyte solution. The electrolyte solution in which the measurement sample is suspended is subjected to a dispersion treatment for 1 minute by an ultrasonic disperser, and thus a particle size distribution of the particles is measured. The number of particles to be measured is 50,000.

A cumulative distribution of volume is drawn from a small diameter side with respect to a particle size range (a channel) divided on the basis of the measured particle size distribution, and a particle size having a cumulation of 50% is defined as a volume average particle size.

Measurement of Glass Transition Temperature of Resin Included in Particles (Particle Group)

A glass transition temperature is measured by using differential scanning calorimeter (DSC-50 manufactured by Shimadzu Corporation) on the basis of JIS 7121-1987. In order to correct a temperature of a detection unit in the device, a melting temperature of a mixture of indium and zinc is used, and in order to correct a heat quantity, melting heat of indium is used.

The particles are put into an aluminum pan as they are, the aluminum pan including the particles therein and an empty aluminum pan for control are set, and the measurement is performed at a rate of temperature increase of 10° C./min.

A temperature of an intersection point between a base line and an extended line of a rising line in a heat absorption portion of a DSC curve obtained by the measurement is set to the glass transition temperature.

Preparation of Colored Floating Particle Group (1) (White Color (W) Particle Group (1))

1) Preparation of Core Particles

Preparation of Continuous Phase

The following materials are mixed, and a polymer dispersant E1 is synthesized by a radical solution polymerization (55° C./6 hours).

Silaplane FM-0711 (manufactured by JNC Corporation, weight average molecular weight Mn=1,000): 36 g Methacrylic acid (manufactured by Sigma-Aldrich Co., LLC.): 0.35 g Silicone oil KF-96L-2CS (manufactured by Shin-Etsu Chemical Co., Ltd.): 40 g Polymerization initiator V-65 (manufactured by Wako Pure Chemical Industries, Ltd.): 0.06 g Dilution is performed by using silicone oil KF-96L-2cs (manufactured by Shin-Etsu Chemical Co., Ltd.) such that a polymerization reactive component is adjusted to be 3 g, and a solution A1 (a continuous phase) including the polymer dispersant E1 is prepared.

Preparation of Dispersion Phase 10 g of a styrene acrylic resin X-1202L (manufactured by Seiko PMC Corporation), 10 g of titanium dioxide TTO-55A (manufactured by Ishihara Sangyo Kaisha, Ltd.), and 90 g of distilled water are mixed, zirconia beads are added thereto, and a dispersion treatment is performed for 1 hour by a rocking mill, and thus a solution B1 (a dispersion phase) is prepared.

Emulsifying and in-Liquid Drying Step 80 g of the solution A1 (a continuous phase), and 20 g of the solution B1 (a dispersion phase) are mixed, and emulsification is performed at 20,000 rpm for 10 minutes by using an omni-homogenizer GLH-115, and an emulsified liquid is prepared.

Next, the obtained emulsified liquid is put into an eggplant flask, and is heated and decompressed to 65° C. and 10 mPa by an evaporator while being stirred, and thus water is removed, and a particle dispersion in which titanium dioxide particles are dispersed in the silicone oil is obtained. The obtained dispersion is precipitated by using centrifugal separation, a supernatant liquid is removed, and toluene is added such that a liquid having solid particle concentration of 20% by weight is prepared, and thus a toluene particle dispersion C1 is obtained.

2) Shell Forming Step

Synthesis of Shell Resin

Styrene (manufactured by Wako Pure Chemical Industries, Ltd.): 70 g

Silaplane FM-0721 (manufactured by JNC Corporation, weight average molecular weight Mw=5000): 25 g Methacrylic acid (manufactured by Tokyo Chemical Industry Co., Ltd.): 5 g Lauroyl peroxide (manufactured by Sigma-Aldrich Co., LLC.): 1 g Toluene (manufactured by Kanto Chemical Co., Inc.): 100 g In the compositions described above, the respective materials are mixed and heated at 75° C. for 6 hours, then are added dropwise in isopropyl alcohol (manufactured by Kanto Chemical Co., Inc.), and are purified by a reprecipitation method, and thus a white color solid (a shell resin) is obtained. Weight average molecular weight Mw of the obtained shell resin is 30,000.

Shell Forming Step

Preparation of Titanium Oxide Particle Dispersion

Shell resin: 10 g

Toluene particle dispersion C1 (solid particle concentration of 20% by weight): 50 g In the compositions described above, the respective materials are mixed, and 200 g of silicone oil KF-96L-2cs (manufactured by Shin-Etsu Chemical Co., Ltd.) is added dropwise therein, and thus a shell resin is precipitated. After that, toluene is removed at 60° C. and 20 mbar by using an evaporator, and thus a dispersion of a colored floating particle group (1) (the white (W) particle group (1)) which is formed of titanium oxide covered with the shell resin is obtained.

Preparation of Cyan (C) Particle Group

1) Preparation of Core Particles

Preparation of Dispersion Phase

The following components are mixed while being heated at 60° C., and a dispersion phase is prepared such that ink solid content concentration is 15% by weight and pigment concentration after being dried is 50% by weight.

Styrene acrylic polymer X345 (manufactured by Seiko PMC Corporation): 7.2 g

Water dispersion Emacol SF Blue H524F (manufactured by Sanyo Color Works, LTD., solid content of 26% by weight) of cyan pigment PB15:3: 18.8 g Distilled water: 24.1 g Preparation of Continuous Phase The following components are mixed, and thus a continuous phase is prepared.

Surfactant KF-6028 (manufactured by Shin-Etsu Chemical Co., Ltd.): 3.5 g

Silicone oil KF-96L-2cs (manufactured by Shin-Etsu Chemical Co., Ltd.): 346.5 g

Preparation of Particles 50 g of the dispersion phase and 350 g of the continuous phase are mixed, and emulsification is performed at a temperature of 30° C. for 10 minutes in the number of rotations 10,000 rpm by using an internal tooth type tabletop disperser ROBOMICS (manufactured by PRIMIX Corporation). As a result thereof, an emulsified liquid of which a drop diameter of the emulsified liquid is 2 μm is obtained. The emulsified liquid is dried at a water bath temperature of 40° C. for 18 hours in a degree of vacuum of 20 mbar by using a rotary evaporator.

The obtained particle suspension liquid is subjected to centrifugal separation at 6,000 rpm for 15 minutes, and a supernatant liquid is removed, then a washing step of causing redispersion by using silicone oil KF-96L-2cs is repeated three times. Thus, 6 g of core particles are obtained. As a result of SEM image analysis, an average particle size is 0.6 μm.

2) Shell Formation (Coacervation Method)

Synthesis of Shell Resin

The following components are mixed, and polymerized at 70° C. for 6 hours in a nitrogen atmosphere.

Silaplane FM-0721 (manufactured by JNC Corporation): 50 g

Hydroxyethyl methacrylate (manufactured by HEMA/Sigma-Aldrich Co., LLC.): 32 g

Monomer AMP-10G (manufactured by Shin-Nakamura Chemical Co., Ltd.) including a phenoxy group: 18 g Monomer Karenz MOI-BP (manufactured by Showa Denko K.K.) including a blocked isocyanate group: 2 g Isopropyl alcohol (manufactured by Kanto Chemical Co., Inc.): 200 g Polymerization initiator AIBN (2,2'-azobisisobutyronitrile, manufactured by Sigma-Aldrich Co., LLC.): 0.2 g The product is purified using cyclohexane as a reprecipitation solvent, and is dried, and thus a shell resin is obtained. 2 g of the shell resin is dissolved in 20 g of t-butanol solvent, and thus a shell resin solution is prepared.

Covering of Particles by Using Shell Resin 1 g of the core particles are put into an eggplant flask of 200 mL, 15 g of silicone oil KF-96L-2cs is added thereto, and thus the particles are stirred and dispersed in the silicone oil while being applied with ultrasonic wave. 7.5 g of t-butanol, 22 g of the shell resin solution, and 12.5 g of silicone oil KF-96L-2cs are sequentially added thereto. An input speed of all of the materials is 2 mL/s. The eggplant flask is connected to a rotary evaporator, and t-butanol is removed at a water bath temperature 50° C. for 1 hour in a degree of vacuum 20 mbar.

The resultant is heated in an oil bath while being further stirred. First, the resultant is heated at 100° C. for 1 hour, residual moisture and residual t-butanol are removed, subsequently heating at 130° C. for 1.5 hours is performed, and a blocking group of the blocked isocyanate group is eliminated, and thus a cross-linking reaction of the shell material is performed.

After being cooled, the obtained particle suspension liquid is subjected to centrifugal separation at 6,000 rpm for 15 minutes, and a supernatant liquid is removed, then a washing step of causing redispersion by using silicone oil KF-96L-2cs is repeated three times. Thus, 0.6 g of a cyan (C) particle group is obtained.

Preparation of Red Color (R) Particle Group

Preparation of Dispersion A-1A

The following components are mixed, and ball mill pulverization is performed for 20 hours by using a zirconia ball of 10 mmΦ, and thus a dispersion A-1A is prepared.

Methyl methacrylate (manufactured by Sigma-Aldrich Co., LLC.): 53 parts by weight 2-(diethylamino)ethyl methacrylate (manufactured by Sigma-Aldrich Co., LLC.): 0.3 parts by weight Red color pigment Red3090 (manufactured by Sanyo Color Works, LTD.): 1.5 parts by weight Preparation of Dispersion A-1B The following components are mixed, and are pulverized by the method described in the dispersion A-1A using a ball mill, and thus a calcium carbonate dispersion A-1B is prepared.

Calcium carbonate: 40 parts by weight

Water: 60 parts by weight

Preparation of Mixed Liquid A-1C

The following components are mixed, deaeration is performed for 10 minutes by using an ultrasonic instrument, then the components are stirred by an emulsification instrument, and thus a mixed liquid A-1C is prepared.

Calcium carbonate dispersion A-1B: 4 g

20% saline solution: 60 g

Preparation of Colored Particles

The following components are mixed, and then deaeration is performed for 10 minutes by using an ultrasonic instrument.

Dispersion A-1A: 20 g

Ethylene glycol dimethacrylate: 0.6 g

Polymerization initiator V601 (Dimethyl 2,2'-azobis(2-methylpropionate): manufactured by Wako Pure Chemical Industries, Ltd.): 0.2 g The components are added to the mixed liquid A-1C, and emulsification is performed by using an emulsification instrument. Next, the emulsified liquid is put into a flask, decompression and deaeration are sufficiently performed, and the flask is filled with nitrogen gas. Next, the emulsified liquid is reacted at 65° C. for 15 hours, and thus particles are prepared. After being cooled, the particles are filtered, and the obtained particle powder is dispersed in ion exchange water, then calcium carbonate is decomposed in hydrochloric acid water, and thus filtration is performed. The particles are cleaned in sufficient distilled water, and are filtered by a nylon sieve having a mesh size of 5 μm and 15 μm, and thus a uniform particle size is obtained. A volume average particle size of the obtained particles (red color particles) is 9 μm.

Shell Formation 95 parts by weight of Silaplane FM-0711 (manufactured by JNC Corporation, weight average molecular weight Mw=1000), 2 parts by weight of glycidyl methacrylate (manufactured by Wako Pure Chemical Industries, Ltd.), 3 parts by weight of methyl methacrylate (manufactured by Wako Pure Chemical Industries, Ltd.) are mixed into 300 parts by weight of isopropyl alcohol (IPA), 1 part by weight of AIBN (2,2-azobisisobutyronitrile) is dissolved as a polymerization initiator, and a polymerization is performed at 70° C. for 6 hours in a nitrogen atmosphere. After that, 300 parts by weight of silicone oil KF-96L-2cs (manufactured by Shin-Etsu Chemical Co., Ltd.) is added, and IPA is removed by decompression, and thus a shell agent is obtained.

After that, 2 parts by weight of the obtained red color particles, 25 parts by weight of the shell agent, and 0.01 parts by weight of triethylamine are mixed, and are stirred at a temperature of 100° C. for 5 hours. After that, the solvent is removed by using centrifugal precipitation, and the mixture is further decompressed and dried, and thus a red color (R) particle group subjected to a surface treatment is obtained.

A volume average particle size of the obtained red color particle group is 9 μm.

Preparation of Cyan, Red, and White Mixed Liquid (Display Dispersion)

The white (W) particle group (1), the cyan (C) particle group, and the red color (R) particle group are weighed and mixed such that a solid content of the C particle group is 0.1 g, a solid content of the R particle group is 1.0 g, and a solid content of the W particle group is 2.0 g, silicone oil KF-96L-2cs (manufactured by Shin-Etsu Chemical Co., Ltd.) is added such that liquid volume is 10 g, and the particles are stirred by ultrasonic wave, and thus a display dispersion is obtained.

Example 1

Preparation of Surface Layer and Display Medium

Preparation of Coating Liquid for Forming Anion Trapping Surface Layer A1

1.16 parts by weight of a phenylboronic acid (manufactured by Sigma-Aldrich Co., LLC.) and 4.5 parts by weight of THF (manufactured by Wako Pure Chemical Industries, Ltd.) are put into a three-necked flask of 100 ml attached with Liebig cooling pipe and are dissolved. 5.1 parts by weight of n-hexane (manufactured by Wako Pure Chemical Industries, Ltd.), 20 parts by weight of carbinol-modified silicone X-22-4039 (manufactured by Shin-Etsu Chemical Co., Ltd.), and 6 parts by weight of molecular sieves (manufactured by Wako Pure Chemical Industries, Ltd.) are added to the dissolved materials, and the resultant is heated to reflux for 2 hours. After being cooled, the molecular sieves are removed, and anhydration is performed by sodium sulfate (manufactured by Tokyo Chemical Industry Co., Ltd.). After that, the solvent is removed, and thus a coating liquid for forming an anion trapping surface layer A1 is obtained.

Preparation of Display Medium

A display medium is prepared as follows.

As an electrode, ITO is formed on a support substrate formed of glass having a thickness of 0.7 mm by a sputtering method to have a thickness of 50 nm.

After that, a solution (20% by weight) of KBM-9659 (manufactured by Shin-Etsu Chemical Co., Ltd.) and isopropanol (manufactured by Wako Pure Chemical Industries, Ltd.), and a solution (10% by weight) of the coating liquid for forming an anion trapping surface layer A1 and silicone oil KF-96L-1cs (manufactured by Shin-Etsu Chemical Co., Ltd.) are prepared, respectively, and are mixed in a weight ratio of 25/75.

The ITO substrate is coated with this mixed liquid by a spin coater, and is dried at 100° C. for 30 minutes, and thus a substrate on which an anion trapping surface layer is formed is obtained. A film thickness of the surface layer is 100 nm. In addition, the substrate on which the surface layer is formed is measured by using an optical densitometer X-Rite MODEL 404 (manufactured by X-Rite Inc.) from a side on which the surface layer is formed, and an L* value is 93.

Furthermore, in the measurement using the optical densitometer in this Example, an average value of measurement results obtained by measuring arbitrary 10 portions in a region to be measured is indicated as a measurement result by using an optical densitometer.

Two surface layer attached ITO substrates thus prepared are set as a display substrate and a back substrate, a Teflon (registered trademark) sheet of 50 μm is set as a spacer, and the display substrate is superimposed on the back substrate by facing surfaces of the display substrate and the back substrate on which a surface layer is formed, and then the display substrate and the back substrate are fixed by a clip.

After that, the display dispersion is injected into a gap between the two surface layer attached ITO substrates, and thus a display medium cell for evaluation is prepared.

Evaluation Test of Memory Property

By using the prepared display medium cell for evaluation, a voltage of 20 V is applied between the substrates (between ITO electrodes thereof) such that the display substrate (the ITO electrode thereof) is charged with a positive polarity, and the back substrate (the ITO electrode thereof) is charged with a negative polarity. Accordingly, the cyan particle group and the red color particle group which are positively charged electrophoretically migrated to a surface on the side of the back substrate, and a color (a white color) of the white color particle group is observed from the display substrate side.

Next, a voltage of 20 V is applied between the substrates (between the ITO electrodes thereof) such that the display substrate (the ITO electrode thereof) is charged with a negative polarity, and the back substrate (the ITO electrode thereof) is charged with a positive polarity. Accordingly, the cyan particle group and the red color particle group which are positively charged electrophoretic migrated to a surface on the side of the display substrate, and a mixed color (a black color) of the cyan particle group and the red color particle group is observed from the display substrate side.

After that, the manipulation described above is continuously performed 30 times, and a voltage of 20 V is applied for 15 seconds such that the display substrate (the ITO electrode thereof) is charged with a negative polarity, and the back substrate (the ITO electrode thereof) is charged with a positive polarity, then the voltage is set to be OFF. Accordingly, the cyan particle group and the red color particle group which are positively charged electrophoretically migrated to the surface on the side of the display substrate, and a mixed color (a black color) of the cyan particle group and the red color particle group is observed from the display substrate side.

After the display medium is kept in this state for two days, the display medium is observed from the display substrate side, and a black color is observed from the display surface. Further, the pair of substrates are peeled off, the L* value is measured from a side of the back substrate on which the surface layer is formed by using an optical densitometer X-Rite MODEL 404 (manufactured by X-Rite Inc.), and the L* value is 93. That is, it is understood that both of the cyan particle group and the red color particle group are maintained on the surface on the side of the display substrate (has a memory property).

Example 2

Preparation of Colored Floating Particle Group (2) (White Color (W) Particle Group (2)) Dispersion 5 parts by weight of 2-vinyl naphthalene (manufactured by Nippon Steel & Sumikin Chemical Co., Ltd.), 5 parts by weight of a silicone macromer FM-0721 (manufactured by JNC Corporation), 0.3 parts by weight of lauroyl peroxide (manufactured by Wako Pure Chemical Industries, Ltd.) as an initiator, and 20 parts by weight of silicone oil KF-96L-1cs (manufactured by Shin-Etsu Chemical Co., Ltd.) are added to a three-necked flask of 100 ml attached with a reflux cooling pipe, bubbling is performed for 15 minutes by nitrogen gas, and then a polymerization is performed at 65° C. for 24 hours in a nitrogen atmosphere, and thus white color particles are obtained.

The obtained white color particles are prepared by silicone oil to have solid content concentration of 40% by weight, and thus a white (W) particle group (2) dispersion is obtained. At this time, a particle size of the white color particles is 450 nm.

Preparation of Magenta (M) Particle Group 4 parts by weight of a silicone-modified polymer KP-545 (manufactured by Shin-Etsu Chemical Co., Ltd.) is dissolved in 96 parts by weight of dimethyl silicone oil (KF-96L-2cs manufactured by Shin-Etsu Chemical Co., Ltd.), and thus a solution X is prepared.

Next, 10 parts by weight of a styrene acrylic polymer (dimethyl ethanolamine neutralization), 5 parts by weight of a water dispersible pigment solution (Unisperse manufactured by BASF Ltd., a magenta color, and pigment concentration of 20% by weight), and 85 parts by weight of pure water are mixed, and thus a solution Y is prepared.

The obtained solution X and the solution Y are mixed, and dispersion and emulsification are performed by using an ultrasonic wave crushing machine (UH-600S manufactured by SMT Corporation).

Next, the suspension liquid is decompressed (2 KPa) and heated (70° C.), moisture is removed, and concentration is adjusted, and thus a silicone oil dispersion (solid particle concentration of 5% by weight) in which electrophoretically migrated particles (the magenta (M) particle group) including a magenta pigment are dispersed in silicone oil is obtained.

Preparation of Cyan, Magenta, and White Mixed Liquid (Display Dispersion)

The white (W) particle group (2), the cyan (C) particle group, and the magenta (M) particle group are weighed and mixed such that a solid content of the C particle group is 0.1 g, a solid content of the M Particle group is 0.1 g, and a solid content of the W particle group is 2.0 g, silicone oil KF-96L-2cs (manufactured by Shin-Etsu Chemical Co., Ltd.) is added such that liquid volume is 10 g, and particles are stirred by ultrasonic wave, and thus a display dispersion is obtained.

Centrifugal Separation Treatment of Display Dispersion 30 g of silicone oil KF-96L-2cs (manufactured by Shin-Etsu Chemical Co., Ltd.) is added to the obtained display dispersion, centrifugal separation is performed for 20 minutes in the number of rotations of 5,500 rpm by using a tabletop type centrifugal separator CN-2060 (manufactured by As One Corporation), and then a supernatant liquid is removed. The manipulation described above is performed three times, and thus a display dispersion having liquid volume of 10 g is prepared.

Preparation of Display Medium

As an electrode, ITO is formed on a support substrate formed of glass having a thickness of 0.7 mm by a sputtering method to have a thickness of 50 nm. After that, a thin film having a thickness of 100 nm is formed on the ITO by a spin coater using Cytop CTL-809M (manufactured by Asahi Glass Co., Ltd.), and thus a substrate on which a Cytop surface layer is formed is prepared.

Two Cytop surface layer attached ITO substrates thus prepared are set as a display substrate and a back substrate, a Teflon (registered trademark) sheet of 50 μm is set as a spacer, and display substrate is superimposed on the back surface by facing surfaces of the display substrate and the back substrate on which a surface layer is formed, and then the display substrate and the back substrate are fixed by a clip.

After that, the display dispersion is injected into a gap between the two Cytop surface layer attached ITO substrates, and thus a display medium cell for evaluation is prepared.

Evaluation Test of Memory Property

By using the prepared display medium cell for evaluation, a voltage of 20 V is applied between the substrates (between ITO electrodes thereof) such that the display substrate (the ITO electrode thereof) is charged with a positive polarity, and the back substrate (the ITO electrode thereof) is charged with a negative polarity. Accordingly, the cyan particle group which is positively charged electrophoretically migrated to a surface on the side of the back substrate, and the magenta particle group which is negatively charged electrophoretically migrated to a surface on the side of the display substrate, and a color (a magenta color) of the magenta particle group is observed from the display substrate side.

Next, a voltage of 20 V is applied between the substrates (between the ITO electrodes thereof) such that the display substrate (the ITO electrode thereof) is charged with a negative polarity, and the back substrate (the ITO electrode thereof) is charged with a positive polarity. Accordingly, the cyan particle group which is positively charged electrophoretically migrated to the surface on the side of the display substrate, and the magenta particle group which is negatively charged electrophoretically migrated to the surface on the side of the back substrate, and a color (a cyan color) of the cyan particle group is observed from the display substrate side.

After that, the manipulation described above is continuously performed 30 times, and a voltage of 20 V is applied for 15 seconds such that the display substrate (the ITO electrode thereof) is charged with a positive polarity, and the back substrate (the ITO electrode thereof) is charged with a negative polarity, then the voltage is set to be OFF. Accordingly, a color (a magenta color) of the magenta particle group is observed from the display substrate side.

After the display medium is kept in this state for two days, the display medium is observed from the display substrate side, and a magenta color which is the same color as that observed when the voltage is set to be OFF is observed. Further, the display medium is observed from the back substrate side, and a cyan color is observed. That is, it is understood that the magenta particle group is maintained on the surface on the side of the display substrate (has a memory property).

Comparative Example 1

A display medium cell is prepared by the same method as that in Example 1 except that carbinol-modified silicone X-22-4039 (manufactured by Shin-Etsu Chemical Co., Ltd.) is used instead of the coating liquid for forming an anion trapping surface layer A1.

That is, a surface layer is formed by the following method, and thus the display medium cell is prepared.

A solution (20% by weight) of KBM-9659 (manufactured by Shin-Etsu Chemical Co., Ltd.) and isopropanol (manufactured by Wako Pure Chemical Industries, Ltd.), and a solution (10% by weight) of carbinol-modified silicone X-22-4039 (manufactured by Shin-Etsu Chemical Co., Ltd.) and silicone oil KF-96L-1cs (manufactured by Shin-Etsu Chemical Co., Ltd.) are prepared, respectively, and are mixed in a weight ratio of 25/75.

The ITO substrate is coated with this mixed liquid by a spin coater, and is dried at 100° C. for 30 minutes, and thus a substrate on which a surface layer for Comparative Example is formed is obtained. A film thickness of the surface layer is 100 nm. In addition, the substrate on which the surface layer is formed is measured by using an optical densitometer X-Rite MODEL 404 (manufactured by X-Rite Inc.) from a side on which the surface layer is formed, and an L* value is 94.

After that, in a manner similar to that in Example 1, a display medium cell for evaluation is prepared.

Evaluation Test of Memory Property

By using the prepared display medium cell for evaluation, a voltage of 20 V is applied between the substrates (between ITO electrodes thereof) such that the display substrate (the ITO electrode thereof) is charged with a positive polarity, and the back substrate (the ITO electrode thereof) is charged with a negative polarity. Accordingly, the cyan particle group and the red color particle group which are positively charged electrophoretically migrated to a surface on the side of the back substrate, and a color (a white color) of the white color particle group is observed from the display substrate side.

Next, a voltage of 20 V is applied between the substrates (between the ITO electrodes thereof) such that the display substrate (the ITO electrode thereof) is charged with a negative polarity, and the back substrate (the ITO electrode thereof) is charged with a negative polarity. Accordingly, the cyan particle group and the red color particle group which are positively charged electrophoretically migrated to a surface on the side of the display substrate, and a mixed color (a black color) of the cyan particle group and the red color particle group is observed from the display substrate side.

After that, the manipulation described above is continuously performed 30 times, and a voltage of 20 V is applied for 15 seconds such that the display substrate (the ITO electrode thereof) is charged with a negative polarity, and the back substrate (the ITO electrode thereof) is charged with a positive polarity, then the voltage is set to be OFF. Accordingly, the cyan particle group and the red color particle group which are positively charged electrophoretically migrated to the surface on the side of the display substrate, and a mixed color (a black color) of the cyan particle group and the red color particle group is observed from the display substrate side.

After the display medium is kept in this state for two days, the display medium is observed from the display substrate side, and a pale cyan color is observed from the display surface. Further, the pair of substrates are peeled off, the L* value is measured from a side of the back substrate on which the surface layer is formed by using an optical densitometer X-Rite MODEL 404 (manufactured by X-Rite Inc.), and the L* value is 25. That is, it is understood that most of the red color particle group and a lot of the cyan particle group are moved (dropped) to the surface on the side of the back substrate (does not have a memory property).

Comparative Example 2

A display medium cell for evaluation is prepared by the same method as that in Example 2 except that a display dispersion which is not subjected to centrifugal separation is used, and in a manner similar to that in Example 2, an evaluation test of a memory property is performed.

As a result thereof, after the display medium is kept for two days, the display medium is observed from the display substrate side, and a pale magenta color is observed from the display surface. Further, the display medium is observed from the back substrate side, and a blue color is observed. That is, it is understood that the magenta particle group electrophoretically migrated to the surface on the side of the display substrate is moved (dropped) to the surface on the side of the back substrate after being kept for two days, and is not maintained on the surface on the side of the display substrate (does not have a memory property).

From the results described above, it is understood that a memory property is improved in this Example, compared to Comparative Example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A particle dispersion for display, comprising:
   a dispersion medium; and
   at least one or more types of positively charged particle groups that are charged with a positive polarity and one or more types of negatively charged particle groups that are charged with a negative polarity dispersed in the dispersion medium, and are moved in the dispersion medium according to an electric field formed in the dispersion medium,
   wherein a total amount of charges of one type of positively charged particle group ($a^\pm$) among the one or more types of positively charged particle groups is greater than a total amount of charges of ions that are charged with a negative polarity and are movable in the dispersion medium, and a total amount of charges of one type of negatively charged particle group ($a^-$) among the one or more types of negatively charged particle groups is greater than the total amount of charges of the ions that are charged with a positive polarity and are movable in the dispersion medium, and
   wherein the positively charged particle group ($a^+$) is the particle group having the smallest surface charge density among the one or more types of positively charged article groups, and the negatively charged particle group ($a^-$) is the particle group having the smallest surface charge density among the one or more types of negatively charged particle groups.

2. The particle dispersion for display according to claim 1,
   wherein the positively charged particle group ($a^+$) is a particle group having the largest volume average particle size among the one or more types of positively charged particle groups, and the negatively charged particle group ($a^-$) is a particle group having the largest volume average particle size among the one or more types of negatively charged particle groups.

3. A display medium, comprising:
   a pair of substrates; and
   the particle dispersion for display according to claim 1, enclosed in a region interposed between the pair of substrates.

4. The display medium according to claim 3, further comprising:
   a surface layer trapping the ions that are charged with a polarity opposite to that of the particle group (a) and are movable in the dispersion medium on at least one of the surfaces in contact with the particle dispersion for display among surfaces of the pair of substrates and a surface of a partition wall that partitions the region interposed between the pair of substrates into a plurality of regions in a surface direction.

5. A display device, comprising:
   the display medium according to claim 3; and
   a voltage applying unit that applies a voltage between the pair of substrates.

* * * * *